(12) United States Patent
Sunahara et al.

(10) Patent No.: US 10,097,093 B2
(45) Date of Patent: Oct. 9, 2018

(54) ELECTRIC POWER CONVERSION SYSTEM

(71) Applicant: TOYOTA JIDOSHA KABUSHIKI KAISHA, Toyota-shi, Aichi-ken (JP)

(72) Inventors: Shohei Sunahara, Toyota (JP); Hidetsugu Hamada, Toyota (JP); Akihiko Ide, Okazaki (JP); Masatoshi Shinohara, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 412 days.

(21) Appl. No.: 14/879,143

(22) Filed: Oct. 9, 2015

(65) Prior Publication Data

US 2016/0105126 A1  Apr. 14, 2016

(30) Foreign Application Priority Data

Oct. 10, 2014 (JP) ................. 2014-208832

(51) Int. Cl.
*H02J 1/10* (2006.01)
*H02J 3/38* (2006.01)
*H02M 3/158* (2006.01)

(52) U.S. Cl.
CPC ....... *H02M 3/1588* (2013.01); *H02M 3/1582* (2013.01); *Y02B 70/1466* (2013.01)

(58) Field of Classification Search
CPC .............. H02M 3/1582; H02M 3/1588; Y02B 70/1466
USPC .......................................................... 307/52
See application file for complete search history.

(56) References Cited

U.S. PATENT DOCUMENTS 9,647,544 B2 * 5/2017 Ishigaki ................ H02M 3/158
2014/0145694 A1  5/2014 Ishigaki et al.

FOREIGN PATENT DOCUMENTS

JP  2013-13234   1/2013
JP  2016-93010   5/2016

* cited by examiner

*Primary Examiner* — Rexford Barnie
*Assistant Examiner* — Toan Vu
(74) *Attorney, Agent, or Firm* — Finnegan, Henderson, Farabow, Garrett & Dunner, LLP

(57) ABSTRACT

An electric power conversion system includes: a first battery; a second battery; an electric power converter including a plurality of switching elements, and configured to bidirectionally step up or step down electric power between an output line and each the first and second batteries in accordance with PWM signals; and a controller configured to control first and second step-up and step-down circuits by generating first and second PWM signals. The first and second step-up and step-down circuits are established between each first and second batteries and the output line. The first and second PWM signals are signals for controlling step-up and step-down operation of each first and second step-up and step-down circuit. The controller is configured to, when coupling on-duty periods of both the first and second PWM signals with each other, execute an overlap phase shift that partially overlaps the on-duty periods of the first and second PWM signals.

2 Claims, 20 Drawing Sheets

FIG. 9
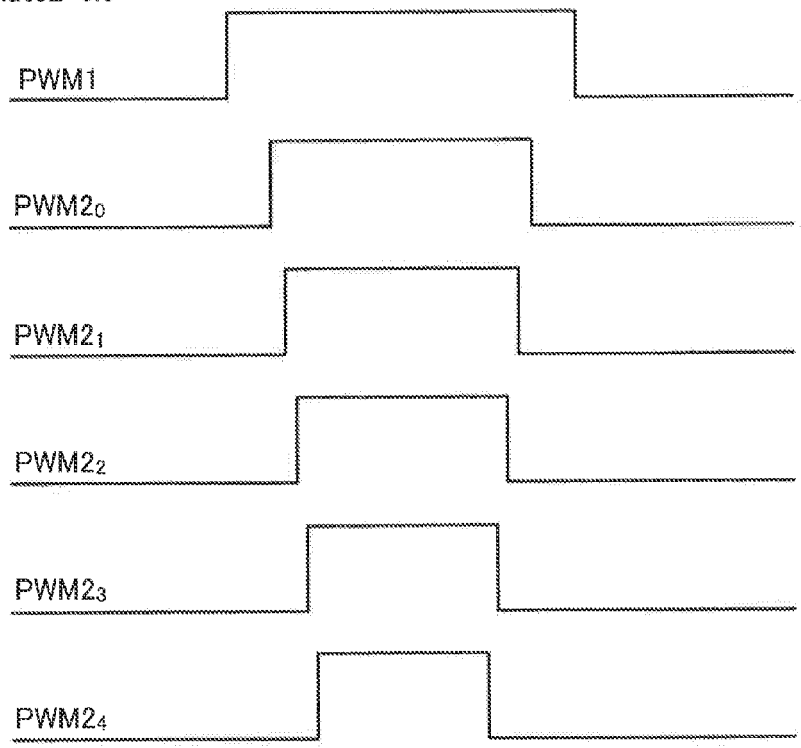
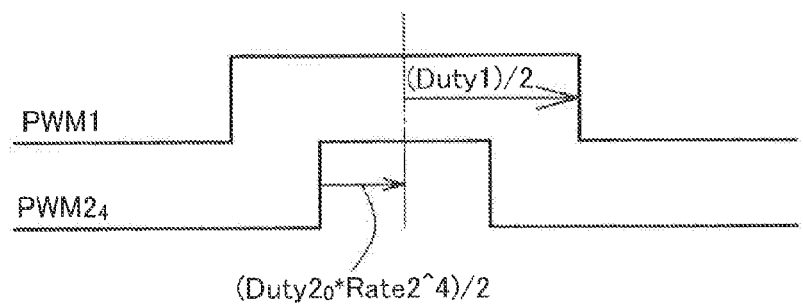

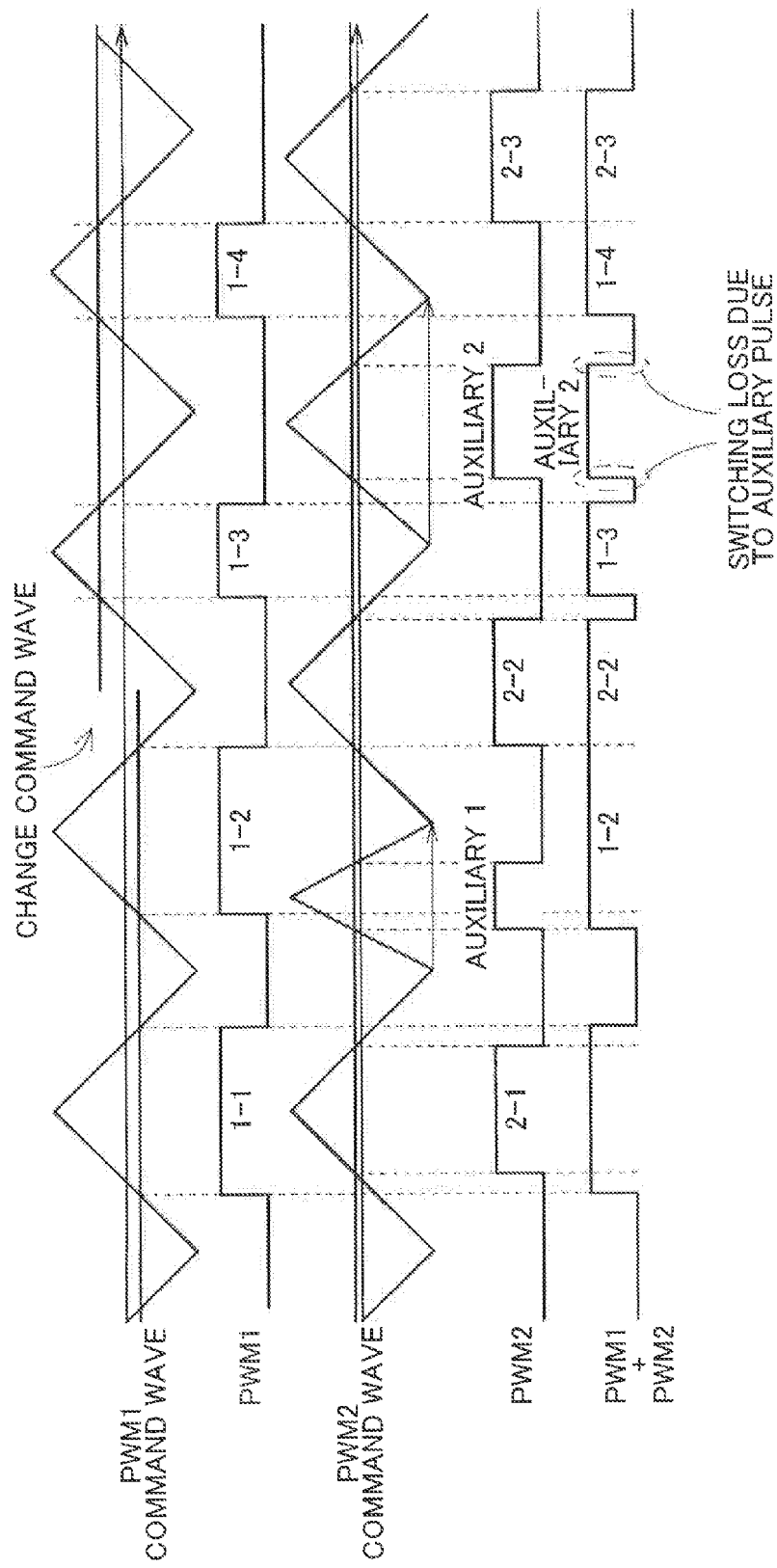

ELECTRIC POWER CONVERSION SYSTEM

INCORPORATION BY REFERENCE

The disclosure of Japanese Patent Application No. 2014-208832 filed on Oct. 10, 2014 including the specification, drawings and abstract is incorporated herein by reference in its entirety.

BACKGROUND OF THE INVENTION

1. Field of the Invention

The invention relates to an electric power conversion system that is able to step up or step down electric power in parallel with two direct-current power supplies.

2. Description of Related Art

In a hybrid vehicle or an electric vehicle, which uses a rotary electric machine as a driving source, the rotary electric machine is driven by alternating-current power that is converted by an inverter from the direct-current power of a battery. In addition, a step-up/step-down converter is provided between the battery and the inverter. The step-up/step-down converter steps up a battery voltage or steps down electric power regenerated by the rotary electric machine.

An electric power converter is, for example, described in Japanese Patent Application Publication No. 2013-013234 (JP 2013-013234 A) as the one that extends the function of the step-up/step-down converter. The electric power converter includes four switching elements, and is connected to two batteries. The electric power converter is able to switch the two batteries between series connection and parallel connection in addition to the step-up/step-down function.

The above-described electric power converter steps up or steps down electric power in parallel with the two batteries at the time of the parallel connection (parallel mode). Step-up/step-down operation is controlled via a PWM signal indicating a duty ratio to each of step-up/step-down circuits. The electric power converter described in JP 2013-013234 A has such a circuit configuration that switching elements are shared between the two step-up/step-down circuits, so each of the switching elements operates in accordance with the logical addition of PWM signals of both.

By utilizing the above operation characteristics of the switching elements, the phases of the PWM signals are shifted from each other in JP 2013-013234 A to reduce a loss that arises in the switching elements. That is, as shown in FIG. 17C, an edge-alignment phase shift is carried out. The edge-alignment phase shift is to shift one or both of the phases of the PWM signals PWM1, PWM2 such that the falling edge of an on period of the PWM signal PWM1 is brought into coincidence (connected) with the rising edge of an on period of the PWM signal PWM2. Thus, the number of times of switching (indicated by the broken line) is reduced as compared to the PWM signal shown in FIG. 17A, with the result that a switching loss is reduced. Because the overlap (hatched portion) of the on periods of the PWM signals PWM1, PWM2 as shown in FIG. 17B disappears, a steady loss (overlap loss) due to an increase in current resulting from the overlap is resolved.

When the edge-alignment phase shift is carried out, as shown at the top of FIG. 18, only merely shifting the rising timing of a carrier signal results in that, as indicated by the hatching in PWM2-2, the on period of PWM2 extends into the third control period, so the on period of PWM2 in the second period becomes shorter than a required value. In order to compensate for such a shortened on period within a phase-shift period, an auxiliary carrier having a period corresponding to the amount of phase shift as shown at the bottom of FIG. 18 is inserted in the existing art. By inserting the auxiliary carrier, an on period provided by an auxiliary pulse arises in PWM2 within the second period, with the result that the above-described shortened on period is compensated.

Incidentally, in a period after the edge-alignment phase shift, if the on period of the PWM signal becomes short as in the case of the PWM signals PWM1-3, PWM2-3 shown in FIG. 19, the rising edge of the on period of the PWM signal PWM2 separates (delays) from the falling edge of the on period of the PWM signal PWM1 as in the case of the PWM signals PWM1-3, PWM2-3 shown in FIG. 19.

When the phase shift is executed again as shown at Auxiliary 2 in FIG. 20, an auxiliary pulse based on the auxiliary carrier arises in the PWM signal as surrounded by the broken lines in FIG. 20, so a switching loss due to the auxiliary pulse arises. That is, as a result of execution of the phase shift, a switching loss due to the auxiliary pulse arises.

In the case where the on period of the PWM signal changes over multiple periods, for example, in the case where the on period of the PWM signal is gradually reduced, if the phase shift is executed by inserting an auxiliary carrier each time the on period is reduced, a switching loss due to an auxiliary pulse frequently arises. As a result, a reduction in loss by connecting the on periods of the PWM signals PWM1, PWM2 is cancelled out by an increase in loss due to an auxiliary pulse, and there is a concern that the effect of a reduction in loss that is the original purpose of the phase shift is not sufficiently obtained.

SUMMARY OF THE INVENTION

The invention provides an electric power conversion system that is able to step up or step down electric power in parallel with two direct-current power supplies and that is able to reduce a loss due to a phase shift.

An aspect of the invention relates to an electric power conversion system. The electric power conversion system includes: a first battery; a second battery; an electric power converter including a plurality of switching elements, the electric power converter being configured to bidirectionally step up or step down electric power between an output line and each the first and second batteries by turning on or off the plurality of switching elements in accordance with PWM signals; and a controller configured to control a first step-up and step-down circuit and a second step-up and step-down circuit by generating a first PWM signal and a second PWM signal, the first step-up and step-down circuit being established between the first battery and the output line, the first PWM signal being a signal for controlling step-up and step-down operation of the first step-up and step-down circuit, the second step-up and step-down circuit being established between the second battery and the output line, the second PWM signal being a signal for controlling step-up and step-down operation of the second step-up and step-down circuit, the controller being configured to, at the time of coupling on-duty periods of both the first and second PWM signals with each other by shifting a phase of at least one of the first and second PWM signals, execute an overlap phase shift that partially overlaps the on-duty periods of the first and second PWM signals by raising one of the PWM signals before the other one of the PWM signals falls.

In the above aspect, a phase shift amount for the overlap phase shift may be set in correspondence with fluctuation predictions of the on-duty periods, and the controller may be configured to, when a total period of the on-duty periods of the first and second PWM signals based on the fluctuation predictions becomes short once every period, set the phase shift amount such that a fall of one of the first, and second PWM signals in a predetermined period coincides with a rise of the other one of the first and second PWM signals in the predetermined period.

In the above aspect, the controller may be configured to (i) carry out the fluctuation predictions of the on-duty periods from an execution period of the phase shift to the predetermined period, and (ii) when a first loss is smaller than a second loss as a result of comparison between the first loss and the second loss, execute the overlap phase shift. The first loss may include a loss that arises in the switching elements in a period from the execution period to the predetermined period when the overlap phase shift is executed. The second loss may include a loss that arises in the switching elements in the period from the execution period to the predetermined period when an edge-alignment phase shift is executed. The edge-alignment phase shift may be a phase shift by which, when a fall of the one of the PWM signals and a rise of the other one of the PWM signals do not coincide with each other, the fall and the rise are brought into coincidence with each other.

According to the above aspect of the invention, it is possible to execute a phase shift that reduces a power loss as compared to an existing phase shift.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 9 is a view that illustrates an overlap phase shift;

FIG. 20 is a view that illustrates an edge-alignment phase shift at the time when a command wave is changed.

DETAILED DESCRIPTION OF EMBODIMENTS

Figure 1:
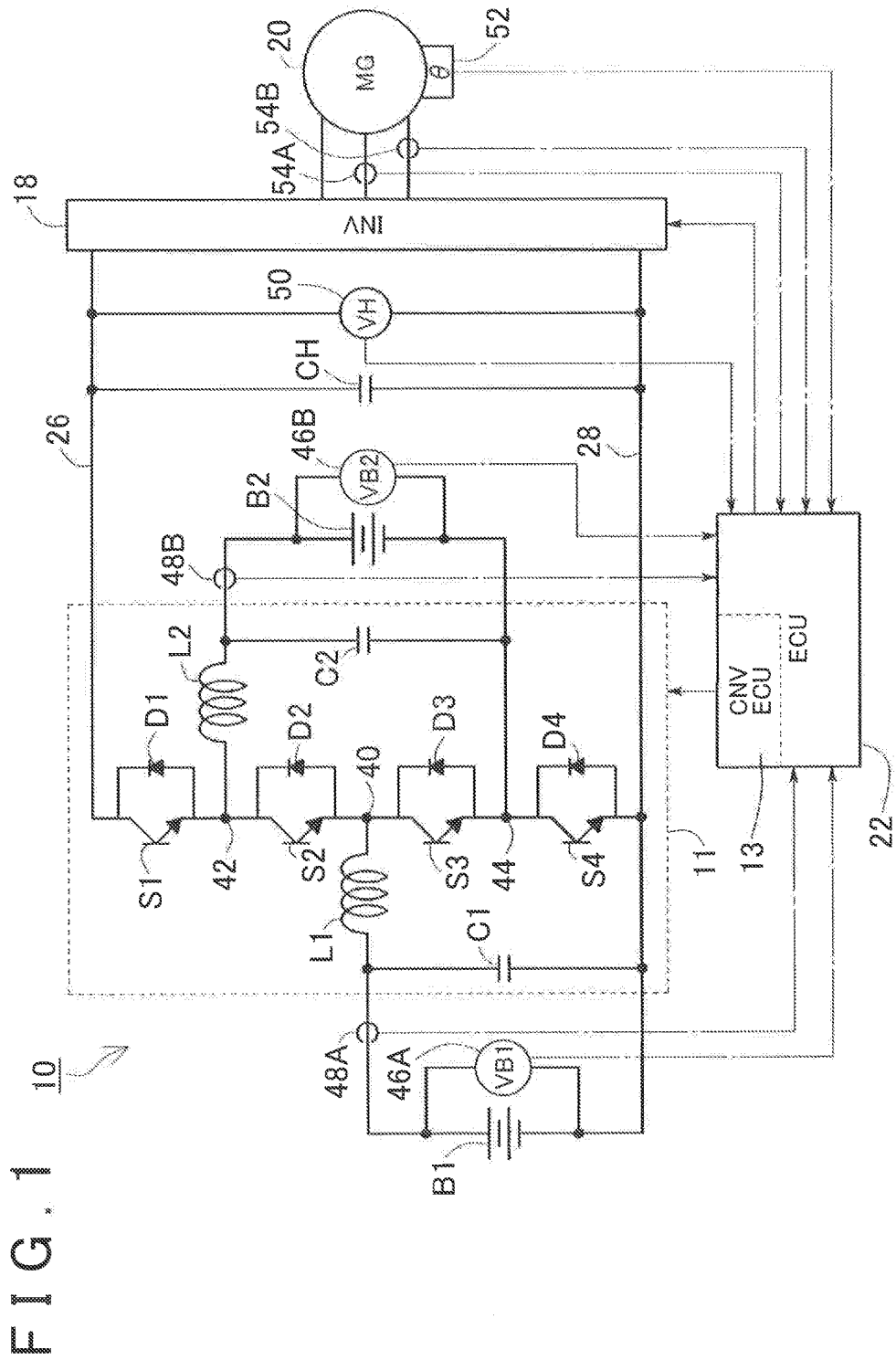
FIG. 1 is a configuration view of an electrical system of a vehicle on which an electric power conversion system according to an embodiment is mounted.

Hereinafter, an embodiment of the invention will be described with reference to the accompanying drawings. FIG. 1 illustrates a configuration, view of an electrical system of a vehicle, including an electric power conversion system 10 according to the present embodiment. The alternate long and short dashed lines in FIG. 1 represent signal lines. In FIG. 1, for the sake of easy understanding, part of components not associated with electric power conversion are not shown in the drawing.

Overall Configuration

The electric power conversion system 10 includes a first battery B1, a second battery B2, an electric power converter 11 (converter) and a CNV controller 13 that controls the electric power converter 11. The electric power conversion system 10 is mounted on a vehicle, such as a hybrid vehicle and an electric vehicle. Other than the electric power conversion system 10, an inverter 18, a rotary electric machine 20 and a controller 22 are mounted on the vehicle.

As shown in FIG. 1, each of the first battery B1 and the second battery B2 is separately connected to the electric power converter 11. The electric power converter 11 steps up direct-current voltages VB1, VB2 from the first battery B1 and the second battery B2, and outputs the stepped-up direct-current voltages VB1, VB2 to the inverter 18.

The inverter 18 is a three-phase inverter, and is connected to the rotary electric machine 20. The inverter 18 converts direct-current power, stepped up by the electric power converter 11, to three-phase alternating-current power, and outputs the three-phase alternating-current power to the rotary electric machine 20. Thus, the rotary electric machine 20 is rotationally driven. The driving force of the rotary electric machine 20 is transmitted to drive wheels (not shown).

During braking of the vehicle, regenerative braking is carried out by the rotary electric machine 20. Regenerated electric power obtained at this time is converted by the inverter 18 from alternating-current power to direct-current power, the direct-current power is stepped down by the electric power converter 11, and the stepped-down direct-current power is supplied to the first battery B1 and the second battery B2.

The CNV controller 13 controls step-up/step-down (electric power conversion) operation and series-parallel switching operation over the electric power converter 11 by controlling the on/off states of switching elements S1 to S4 of the electric power converter 11. The controller 22 controls DC-AC conversion or AC-DC conversion by controlling the on/off states of switching elements (not shown) of the inverter 18. Through control over the electric power converter 11 and the inverter 18, the CNV controller 13 and the controller 22 control the driving of the rotary electric machine 20.

Details of Components

Each of the first battery B1 and the second battery B2 is a direct-current power supply formed of a secondary battery, and is, for example, a lithium ion secondary battery or a nickel-metal hydride secondary battery. At least one of the first battery B1 or the second battery B2 may be an electrical storage element, such as an electric double layer capacitor, instead of a secondary battery.

The inverter 18 converts direct-current power, stepped up by the electric power converter 11, to three-phase alternating-current power and also converts regenerated electric power (three-phase alternating-current power), regenerated by the rotary electric machine 20, to direct-current power by turning on or off the switching elements (not shown).

The electric power converter 11 steps up or steps down voltage (converts electric power) between the rotary electric machine 20 (load) and each of the first battery B1 and the second battery B2 and also switches connection of the first battery B1 and the second battery B2 to the rotary electric machine 20 between series connection and parallel connection by turning on or off the switching elements S1 to S4.

Each of the switching elements S1 to S4 of the electric power converter 11 is, for example, a transistor element, such as an IGBT. As will be described later, each of the switching elements S1 to S4 is turned on or off in accordance with the logical addition of a PWM1 and a PWM2. The PWM1 is a first PWM signal. The PWM2 is a second PWM signal. The switching elements S1 to S4 are connected in series with each other such that the direction from a high-voltage line 26 toward a reference line 28 is a forward direction. The high-voltage line 26 is an output line of the electric power converter 11. In addition, diodes D1 to D4 are respectively connected in antiparallel with the switching elements S1 to S4.

The electric power converter 11 includes a first reactor L1 and a first capacitor C1. The first reactor L1 is connected in series with the first battery B1. The first capacitor C1 is connected in parallel with the first battery B1. The electric power converter 11 includes a second reactor L2 and a second capacitor C2. The second reactor L2 is connected in series with the second battery B2. The second capacitor C2 is connected in parallel with the second battery B2.

The first battery B1 is connected between a connection point (node) 40 and the reference line 28. The connection point (node) 40 is provided between the second switching element S2 and the third switching element S3 from the high-voltage line 26 side. In addition, the second battery B2 is connected between a connection point 42 and a connection point 44. The connection point 42 is provided between the first switching element S1 and the second switching element S2 from the high-voltage line 26 side. The connection point 44 is provided between the third switching element S3 and the fourth switching element S4 from the high-voltage line 26 side.

Figure 2:
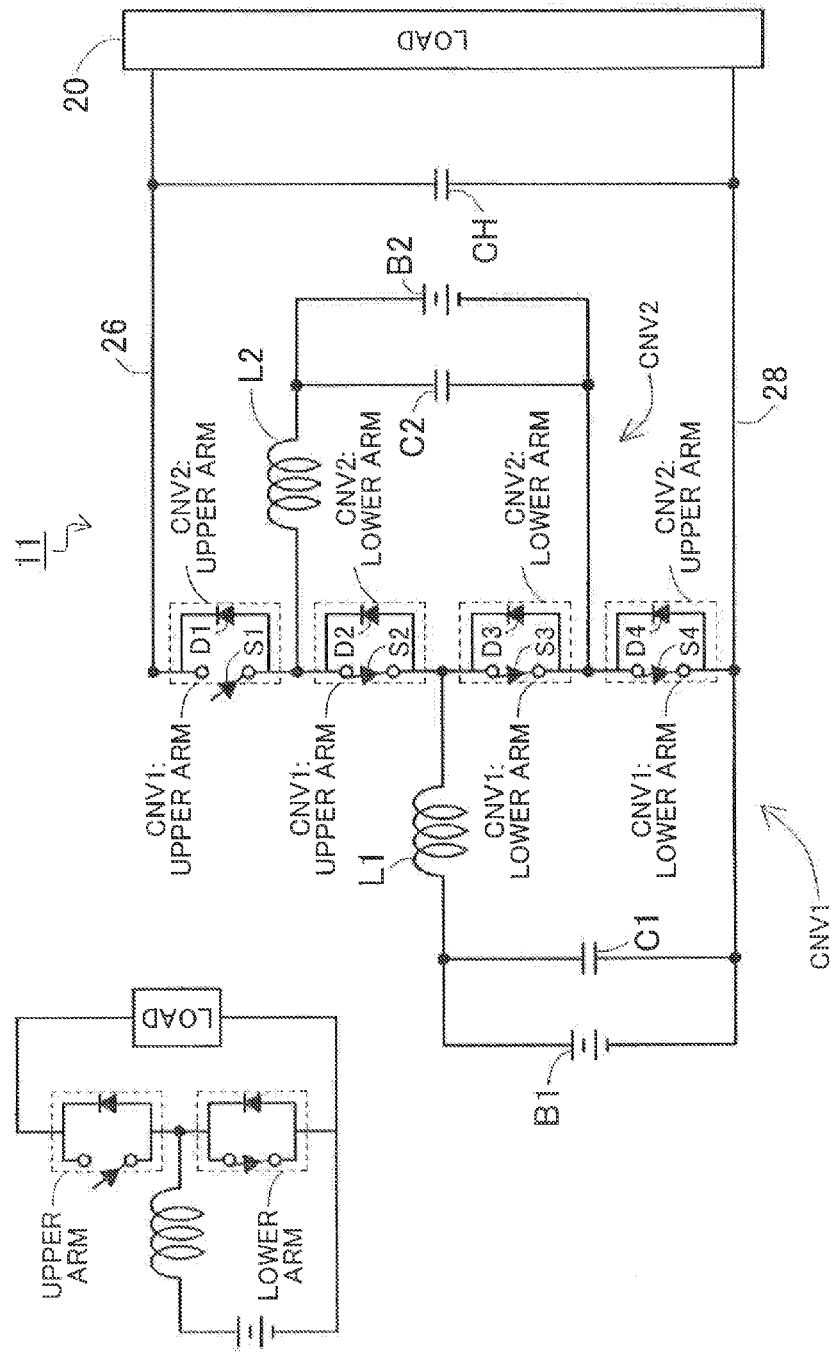
FIG. 2A and FIG. 2B are views that illustrate the configuration of an electric power converter according to the embodiment.

The electric power converter 11 is able to switch connection of the first battery B1 and the second battery B2 to the rotary electric machine 20 (load) between series connection and parallel connection, as described above. In the parallel connection, as shown in FIG. 2A, a first step-up/step-down circuit CNV1 is established between the first battery B1 and the high-voltage line 26 (output line), and a second step-up/step-down circuit CNV2 is established between the second battery B2 and the high-voltage line 26.

The first step-up/step-down circuit CNV1 includes the first battery B1, the first reactor L1 and the first capacitor C1. The second step-up/step-down circuit CNV2 is provided in parallel with the first step-up/step-down circuit CNV1, and includes the second battery B2, the second reactor L2 and the second capacitor C2. The switching elements S1 to S4 turn on or off to switch between storage and discharge of electric charge of the first and second reactors L1, L2.

In this way, the first step-up/step-down circuit CNV1 and the second step-up/step-down circuit CNV2 have such a circuit configuration that the switching elements S1 to S4 and the diodes D1 to D4 are shared. However, the functions of the elements are partially different between the first step-up/step-down circuit CNV1 and the second step-up/step-down circuit CNV2. Specifically, the functions of the switching elements S1 to S4 and diodes D1 to D4 as "arms" are different, between the first step-up/step-down circuit CNV1 and the second step-up/step-down circuit CNV2. The arm indicates a combination of each switching element and a corresponding one of the diodes connected in antiparallel with the switching element.

FIG. 2B shows the circuit diagram of an existing step-up/step-down converter. In this converter, two arms are divided into an "upper arm" and a "lower arm". Conventionally, the lower arm indicates an arm that establishes a loop circuit including a battery and a reactor. The upper arm indicates an arm that establishes a circuit that connects both a battery and a reactor to a load.

The upper-arm and lower-arm switching elements are complementarily turned on or off. That is, when the lower-arm switching element is in the on state, the upper-arm switching element is in the off state. Conversely, when the upper-arm switching element is in the on state, the lower-arm switching element is in the off state. Considering PWM signals for turning on or off the switching elements, where the PWM signal supplied to the upper-arm switching element is PWM; the PWM signal supplied to the lower-arm switching element is /PWM that is an inversion signal.

Hereinafter, setting the upper-arm switching element to the on state is termed "upper arm on", and setting the lower-arm switching element to the on state is termed "lower arm on".

Focusing on the above-described functions of the upper arm and lower arm, when viewed from the first step-up/step-down circuit CNV1, the arm (S1 arm) including the switching element S1 and the arm (S2 arm) including the switching element S2 are upper arms and the arm (S3 arm) including the switching element S3 and the arm (S4 arm) including the switching element S4 are lower arms. On the other hand, when viewed from the second step-up/step-down circuit CNV2 of the electric power converter 11, the S1 arm and the S4 arm are upper arms, and the S2 arm and the S3 arm are lower arms.

Referring back to FIG. 1, the controller 22, as will be described later, executes various operation controls over the vehicle, including voltage conversion and switching of power supply connection over the electric power converter 11 or the inverter 18. The controller 22 may be a computer called electronic control unit (ECU). The controller 22 includes, for example, a CPU that is an arithmetic circuit, a storage unit, such as a memory, and a device and sensor interface, which are connected with each other via an internal bus.

The storage unit of the controller 22 stores a control program for the switching elements S1 to S4, a program for a phase shift (described later), a loss map of the switching elements S1 to S4, and a shift amount map.

The controller 22 receives signals from various sensors via the device and sensor interface. Specifically, the controller 22 receives detected values from battery voltage sensors 46A, 46B and battery current sensors 48A, 48B as the signals associated with the first battery B1 and the second battery B2. The battery voltage sensors 46A, 46B respectively measure battery voltage values VB1, VB2. The battery current sensors 48A, 48B respectively measure battery current values I1, I2. The controller 22 receives a detected value from an output voltage sensor 50 as the signal associated with the output voltage of the electric power converter 11. The output voltage sensor 50 is connected in parallel with a smoothing capacitor CH, and measures a potential difference VH (output voltage) between the high-voltage line 26 and the reference line 28.

The controller 22 receives an actual rotation angle of the rotary electric machine 20 and a detected signal of three-phase alternating currents from a resolver 52 and current sensors 54A 54B as the signals associated with the rotary electric machine 20. The controller 22 receives detected signals of pedal depression amounts from an accelerator pedal depression amount sensor and a brake pedal depression amount sensor (not shown) as other vehicle information.

The controller 22 includes the CNV controller 13 as part of the controller 22. The controller 22 and the CNV controller 13 may be incorporated in a single computer. When part of resources, such as the CPU and the memory, are allocated to the CNV controller 13, the CNV controller 13 is able to operate independently of the controller 22. The controller 22 and the CNV controller 13 may be formed of separate computers.

The CPU of the CNV controller 13 functions as means for controlling the electric power converter 11 by executing the control program of the switching elements S1 to S4, the program of the phase shift, or the like, stored in the storage unit of the computer. Specifically, the CNV controller 13 generates a first PWM signal PWM1 and a second PWM signal PWM2 and outputs the first PWM signal PWM1 and the second PWM signal PWM2 to the switching elements S1 to S4. The first PWM signal PWM1 corresponds to a duty ratio that sets electric charge storage/discharge periods of the first reactor L1 of the first step-up/step-down circuit CNV1. The second PWM signal PWM2 corresponds to a duty ratio that sets electric charge storage/discharge periods of the second reactor L2 of the second step-up/step-down circuit CNV2. That is, the CNV controller 13 controls the on/off operations of the switching elements S1 to S4 via the PWM signals PWM1, PWM2. In addition, the CNV controller 13 controls the first step-up/step-down circuit CNV1 and the second step-up/step-down circuit CNV2 through control over the switching elements S1 to S4.

Operation of Electric Power Converter

The detailed operation of the electric power converter 11 is already known from the above-described JP 2013-013234 A, or the like, so only a parallel step-up/step-down mode associated with a phase shift (described later) will be described. In addition, as for the parallel step-up/step-down mode, because of duality between a step-up mode and a step-down mode, only a parallel step-up mode will be described, and the description of a parallel step-down mode is omitted.

In the step-up mode, mainly, two modes, that is, a charge mode and a discharge mode, are changed over to each other by the switching elements S1 to S4. In the charge mode, electric charge is stored in the reactor. In the discharge mode, stored electric charge is discharged to a load. In the parallel step-up mode, the charge mode and the discharge mode are executed in each of the first step-up/step-down circuit CNV1 and the second step-up/step-down circuit CNV2 independently of each other. That is, in the step-up mode, the two types of operation modes are changed by the two types of circuits, so four types of operation states are considered in total. Hereinafter, these operation states will be described with reference to FIG. 3 to FIG. 6.

Figure 3:
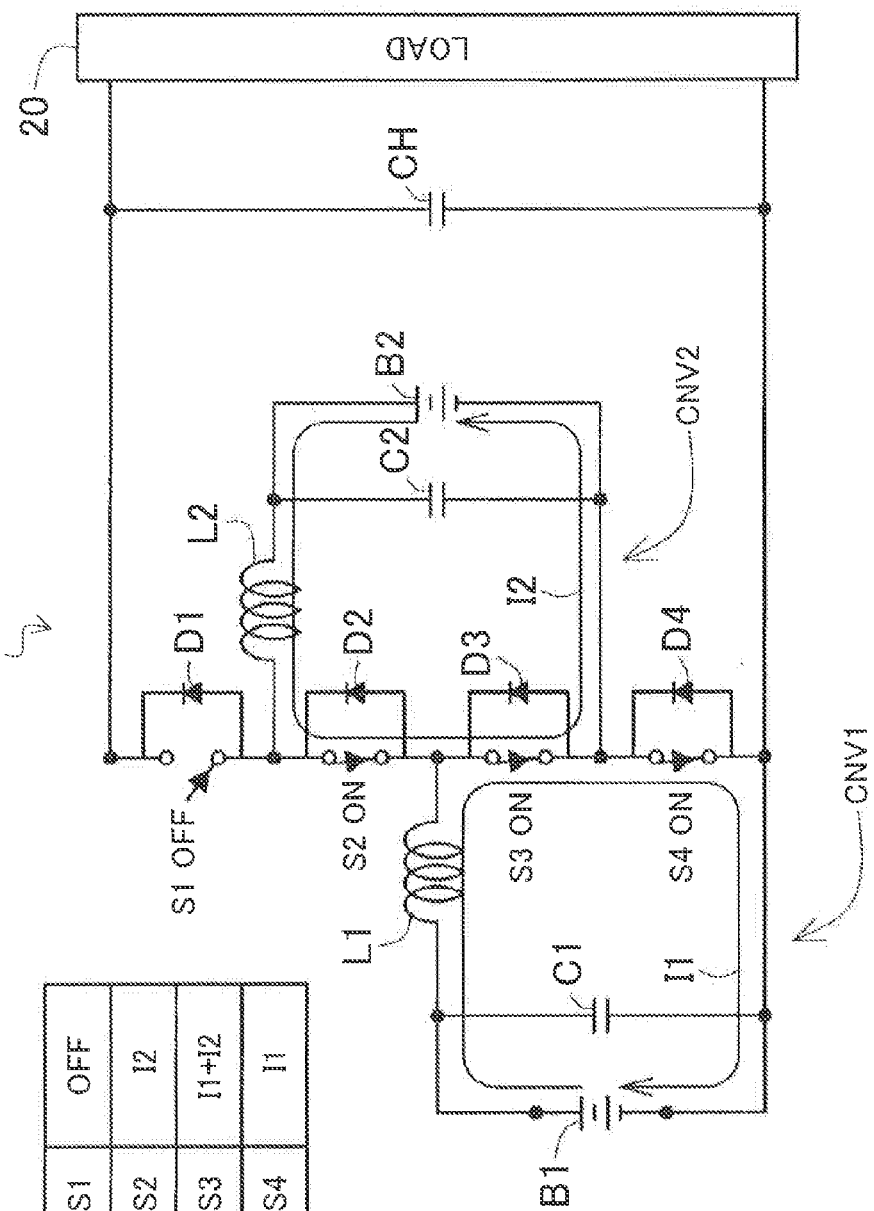
FIG. 3 is a view that illustrates the operation (CNV1 and CNV2 charge) of the electric power converter according to the embodiment.

FIG. 3 shows a view at the time when both the first and second step-up/step-down circuits CNV1, CNV2 are in the charge mode. In view of the operation of the existing step-up/step-down converter shown to the top left of FIG. 2, in the charge mode, the upper arm off and the lower arm on are set, so, in the electric power converter 11 shown in FIG. 3, the switching elements S2 to S4 of the S2 to S4 arms that are the lower arms of at least one of the first step-up/step-down circuit CNV1 or the second step-up/step-down circuit CNV2 are in the on state. The switching element S1 of the S1 arm that is the upper arm of both the first and second step-up/step-down circuits CNV1, CNV2 is in the off state.

Current components respectively flowing through the switching elements S1 to S4 in the drawing are shown to the top left of FIG. 3. The switching element S1 is in the off state. The current I2 from the second battery B2 flows through the switching element S2. The current I1 from the first battery B1 and the current I2 from the second battery B2 flow through the switching element S3. The current I1 from the first battery B1 flows through the switching element S4.

Figure 4:
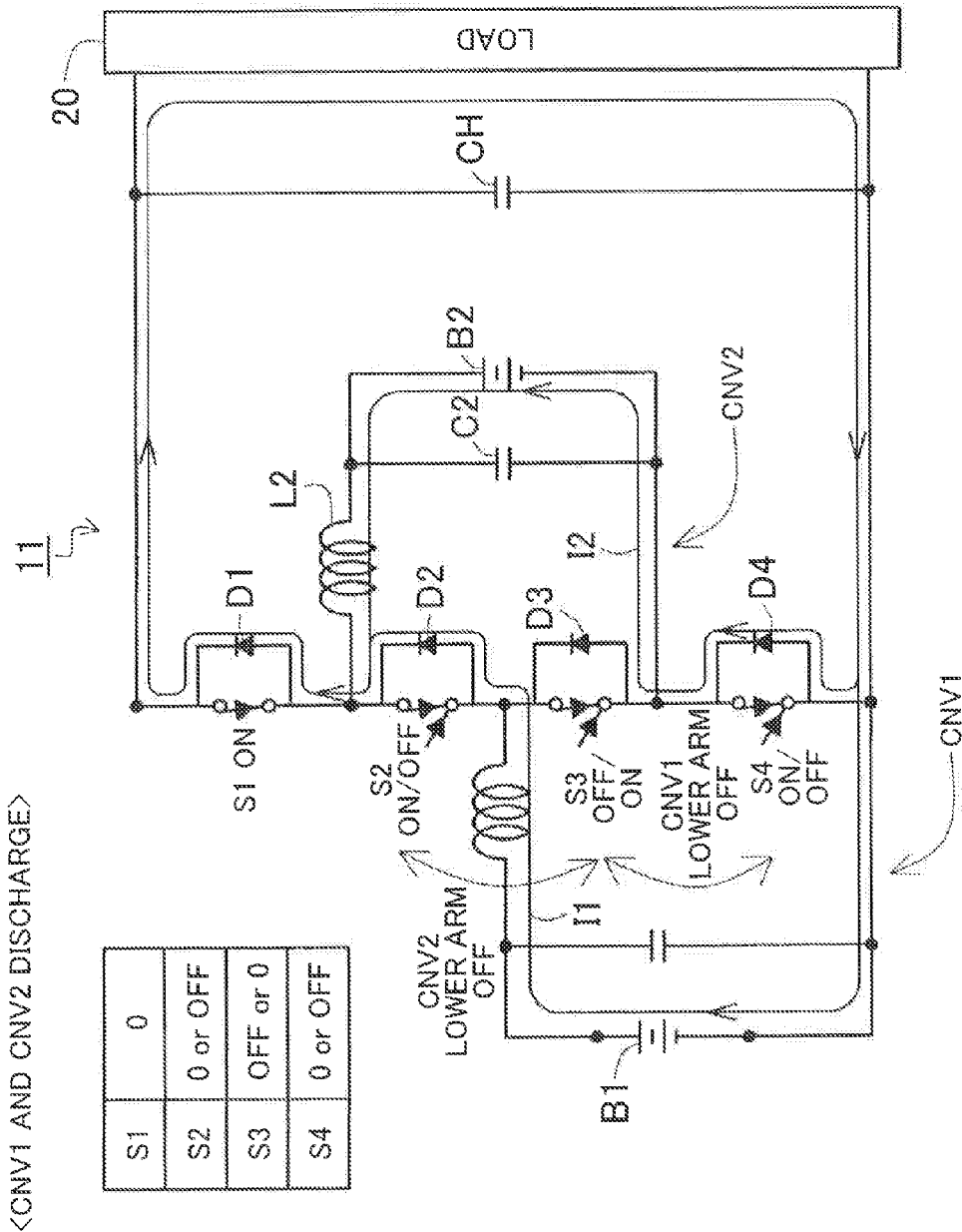
FIG. 4 is a view that illustrates the operation (CNV1 and CNV2 discharge) of the electric power converter according to the embodiment.

FIG. 4 shows a view at the time when both the first and second step-up/step-down circuits CNV1, CNV2 are in the discharge mode. In the discharge mode, the upper arm on and the lower arm off are set, so the switching element S1 of the S1 arm that is the upper arm of both the first and second step-up/step-down circuits CNV1, CNV2 is in the on state. The switching elements S2 to S4 of the S2 to S4 arms that are the lower arms of at least one of the first step-up/step-down circuit CNV1 or the second step-up/step-down circuit CNV2 are in the off state.

At this time, when one of the S3 arm and the S4 arm that are the lower arms for the first step-up/step-down circuit CNV1 is set to the off state, the loop circuit that connects the first battery B1 with the first reactor L1 is interrupted, so the mode is changed to the discharge mode. Similarly, when one of the S2 arm and the S3 arm that are the lower arms for the second step-up/step-down circuit CNV2 is set to the off state, the mode is changed to the discharge mode.

That is, in the discharge and discharge mode shown in FIG. 4, one of the S3 arm and the S4 arm just needs to be in the off state for the first step-up/step-down circuit CNV1, and one of the S2 arm and the S3 arm just needs to be in the off state for the second step-up/step-down circuit CNV2. In other words, when one of the switching elements S2, S3 and one of the switching elements S3, S4 are in the off state, the discharge and discharge mode is set.

Current components respectively flowing through the switching elements S1 to S4 in the drawing are shown to the top left of FIG. 4. As shown in FIG. 4, in the discharge mode in a step-up process, almost no current flows through the switching elements S1 to S4 (≈0), but current flows through the diodes D1 to D4. For this reason, no current flows through the switching element S1, and no current flows though the switching elements S2 to S4 or the switching elements S2 to S4 are set to the off state.

Figure 5:
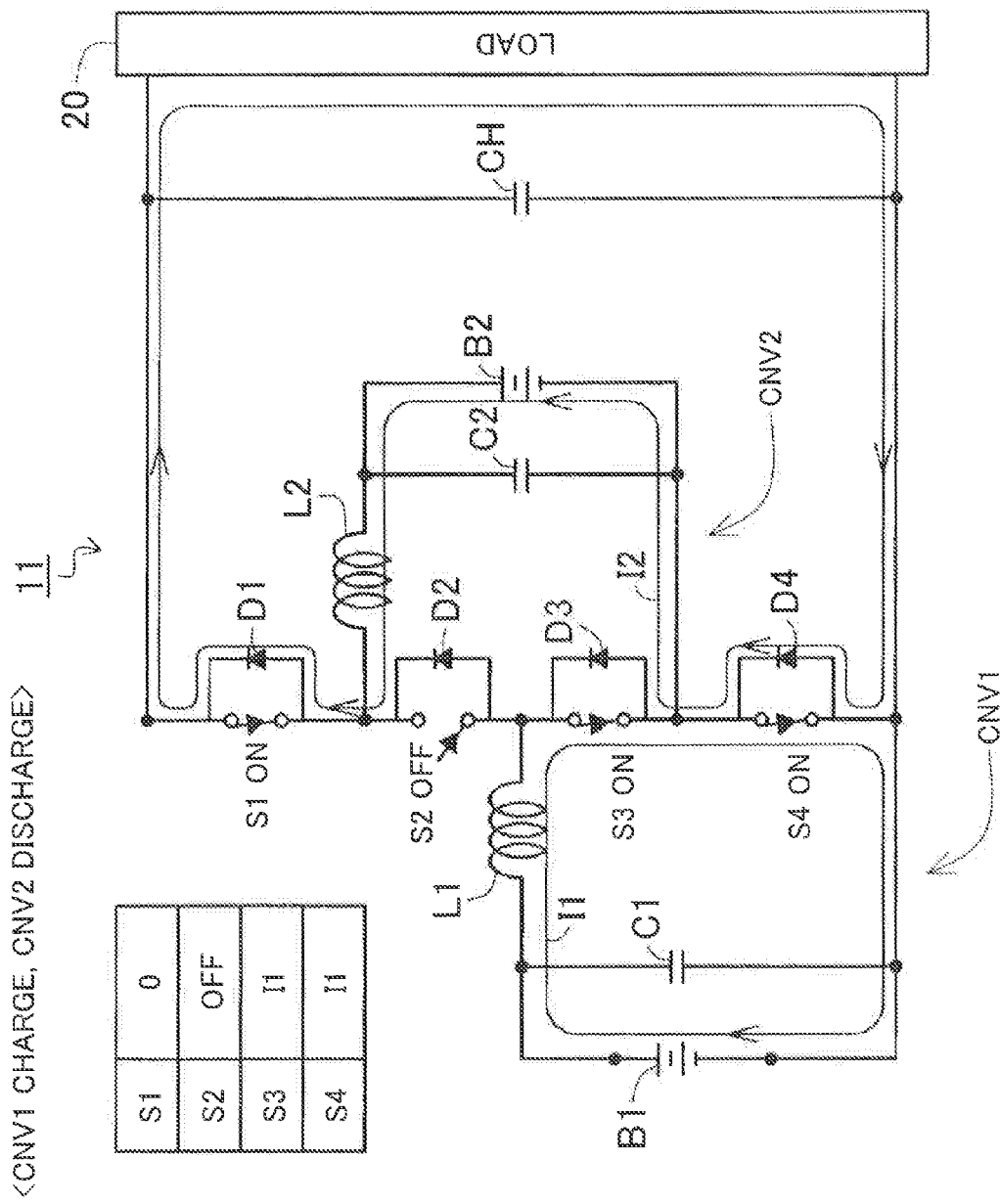
FIG. 5 is a view that illustrates the operation (CNV1 charge, CNV2 discharge) of the electric power converter according to the embodiment.

FIG. 5 shows a view at the time when the first step-up/step-down circuit CNV1 is in the charge mode and the second step-up/step-down circuit CNV2 is in the discharge mode. The upper arm off and the lower arm on (S1 off S2 off S3 on, S4 on) are set in the first step-up/step-down circuit CNV1, and the upper arm on and the lower arm off (S1 on, S2 off, S3 off, S4 on) are set in the second step-up/step-down circuit CNV2. According to the principle of superposition, by calculating the logical addition of both circuits, the on/off states of the switching elements are S1 on, S2 off, S3 on, S4 on.

Current components respectively flowing through the switching elements S1 to S4 in the drawing are shown to the top left of FIG. 5. As shown in the circuit diagram of FIG. 5, almost no current flows through the switching element S1. The switching element S2 is in the off state. The current I1 from the first battery B1 flows through the switching elements S3, S4.

Figure 6:
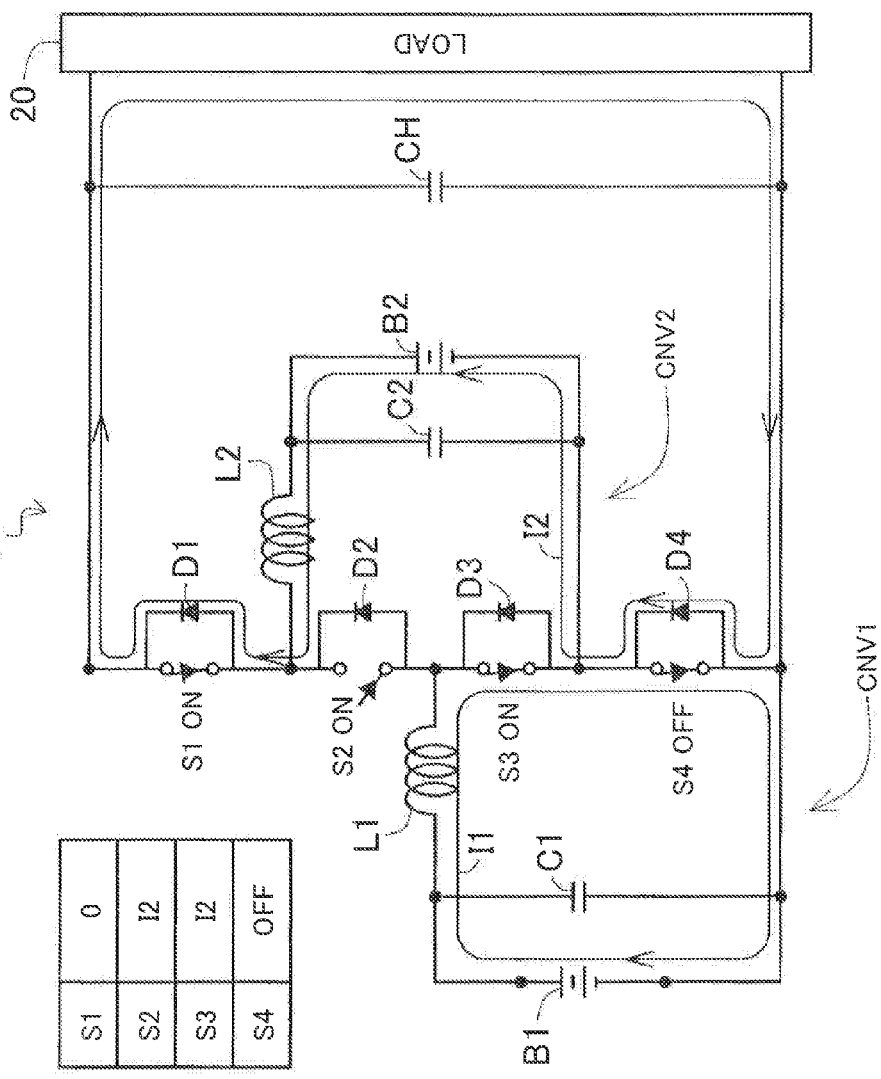
FIG. 6 is a view that illustrates the operation (CNV1 discharge, CNV2 charge) of the electric power converter according to the embodiment.

FIG. 6 is an inversion of FIG. 5, that is, FIG. 6 shows a view at the time when the first step-up/step-down circuit CNV1 is in the discharge mode and the second step-up/step-down circuit CNV2 is in the charge mode. The upper arm on and the lower arm off (S1 on, S2 on, S3 off, S4 off) are set in the first step-up/step-down circuit CNV1, and the upper arm off and the lower arm on (S1 off S2 on, S3 on, S4 off) are set in the second step-up/step-down circuit CNV2. According to the principle of superposition, by calculating the logical addition of both circuits, the on/off states of the switching elements are S1, on, S2 on, S3 on, S4 off.

Current components respectively flowing through the switching elements S1 to S4 in the drawing are shown to the top left of FIG. 6. As shown in the circuit diagram of FIG. 6, almost no current flows through the switching element S1. The current I2 from the second battery B2 flows through the switching elements S2, S3. The switching element S4 is in the off state.

Feedback Control of Controller

As described above, the CNV controller 13 controls the on/off operations of the switching elements S1 to S4 through the PWM signals PWM1, PWM2. Generation of the PWM signals PWM1, PWM2 will be described. The CNV controller 13 executes feedback control for obtaining a difference between the measured output voltage VH of the electric power converter 11 and a target value VH* of the output voltage and reducing the difference. If a feedback gain is excessive in the control, hunting that an intended parameter (output voltage VH) oscillates occurs, so the output voltage VH is gradually brought close to the target value VH* over multiple periods.

Figure 7:
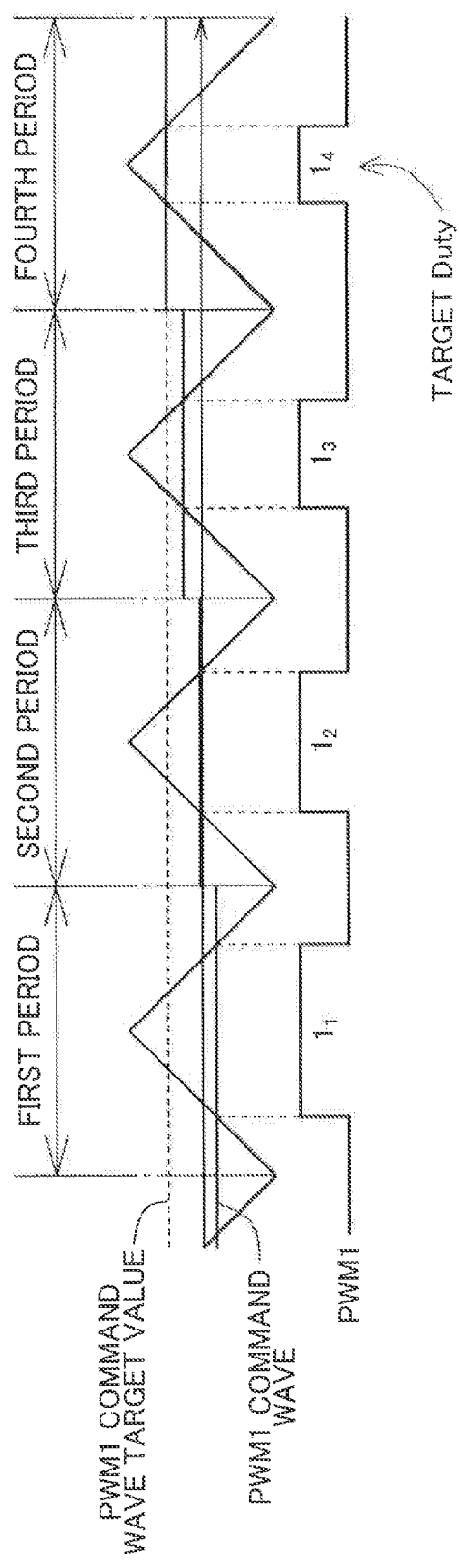
FIG. 7 is a view that illustrates feedback control that is executed by a CNV controller.

For example, when the controller 22 determines a request to increase output torque on the basis of, for example, an increase in pedal stroke amount received from an accelerator pedal sensor, the controller 22 raises the target value VH* of the output voltage of the electric power converter 11. The CNV controller 13 sets target command values for the first step-up/step-down circuit CNV1 and the second step-up/step-down circuit CNV2 on the basis of the raised target value VH* as indicated by the broken line in FIG. 7. FIG. 7 shows only the process of generating the PWM signal PWM1 for the first step-up/step-down circuit CNV1.

The CNV controller 13 sets the rate of increase and gradually brings the command wave to the target value by raising the command wave of the PWM signal once every period. The rate of increase may be a predetermined upper limit value of the feedback gain. As a result of a rise in the command value over multiple periods, an on-duty period (hereinafter, simply referred to as on period) of the PWM signal PWM1 is gradually reduced.

Phase Shift by Controller—Edge-Alignment Phase Shift

Figure 17A:
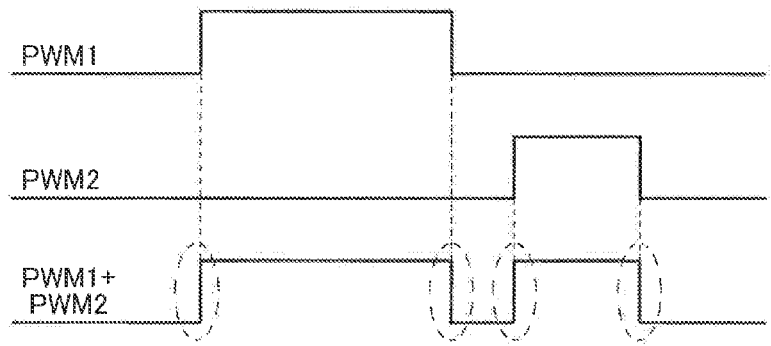
FIG. 17A to FIG. 17C are views that illustrate the outlines of a phase shift.
Figure 17B:
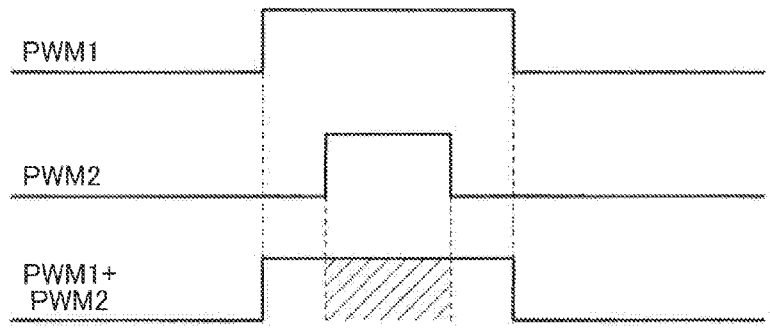
Figure 17C:
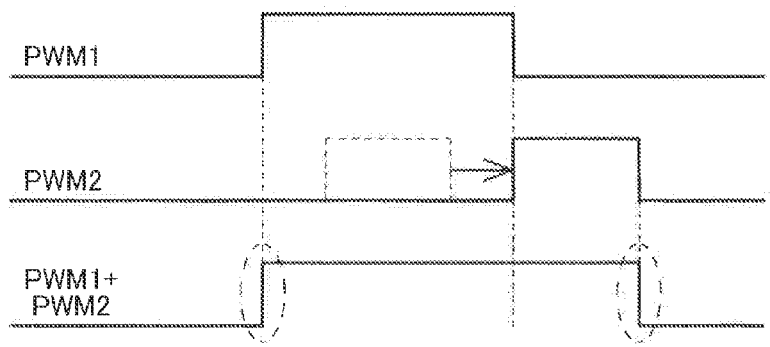
Figure 18:
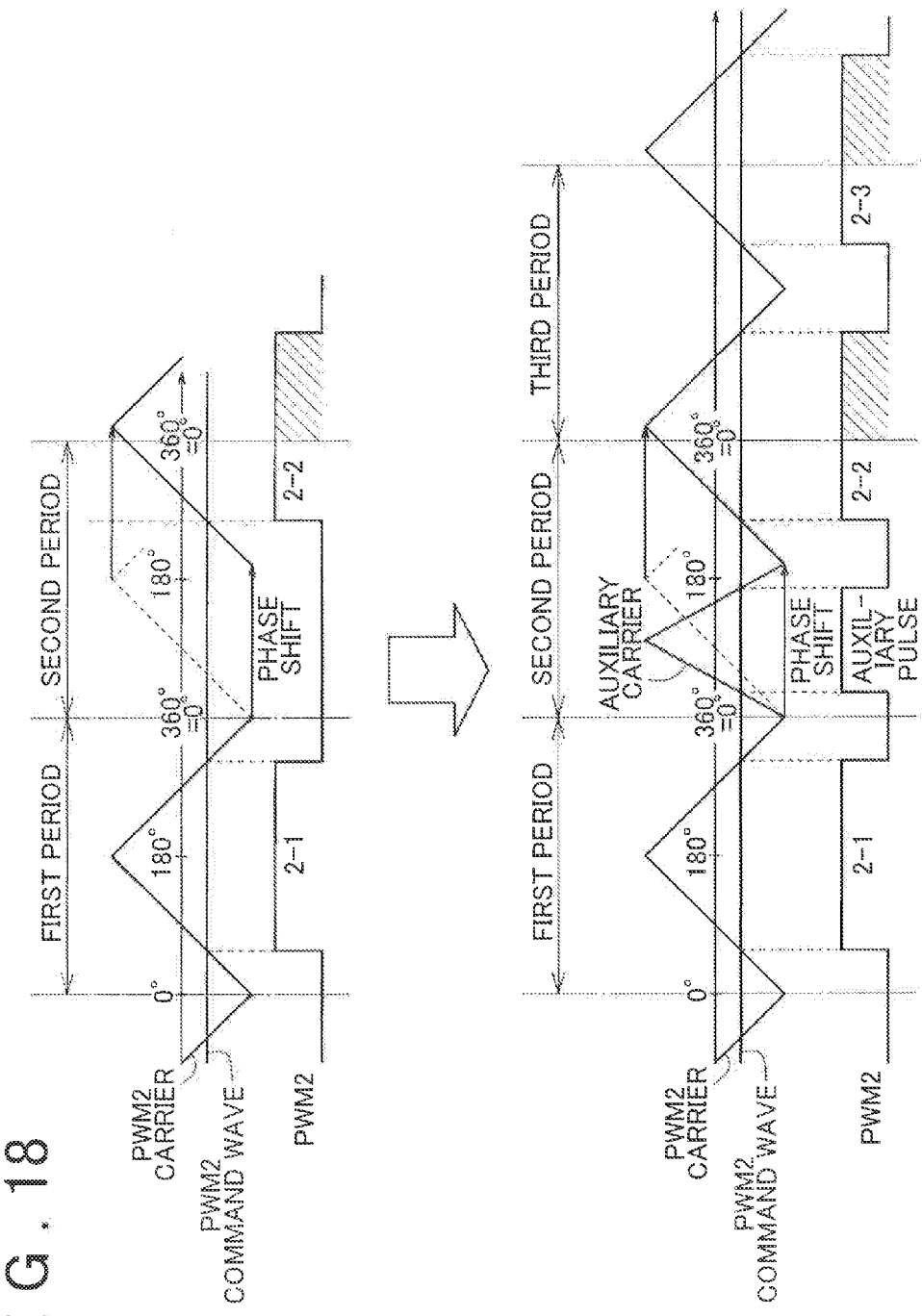
FIG. 18 is a view that illustrates a phase shift by inserting an auxiliary carrier.
Figure 19:
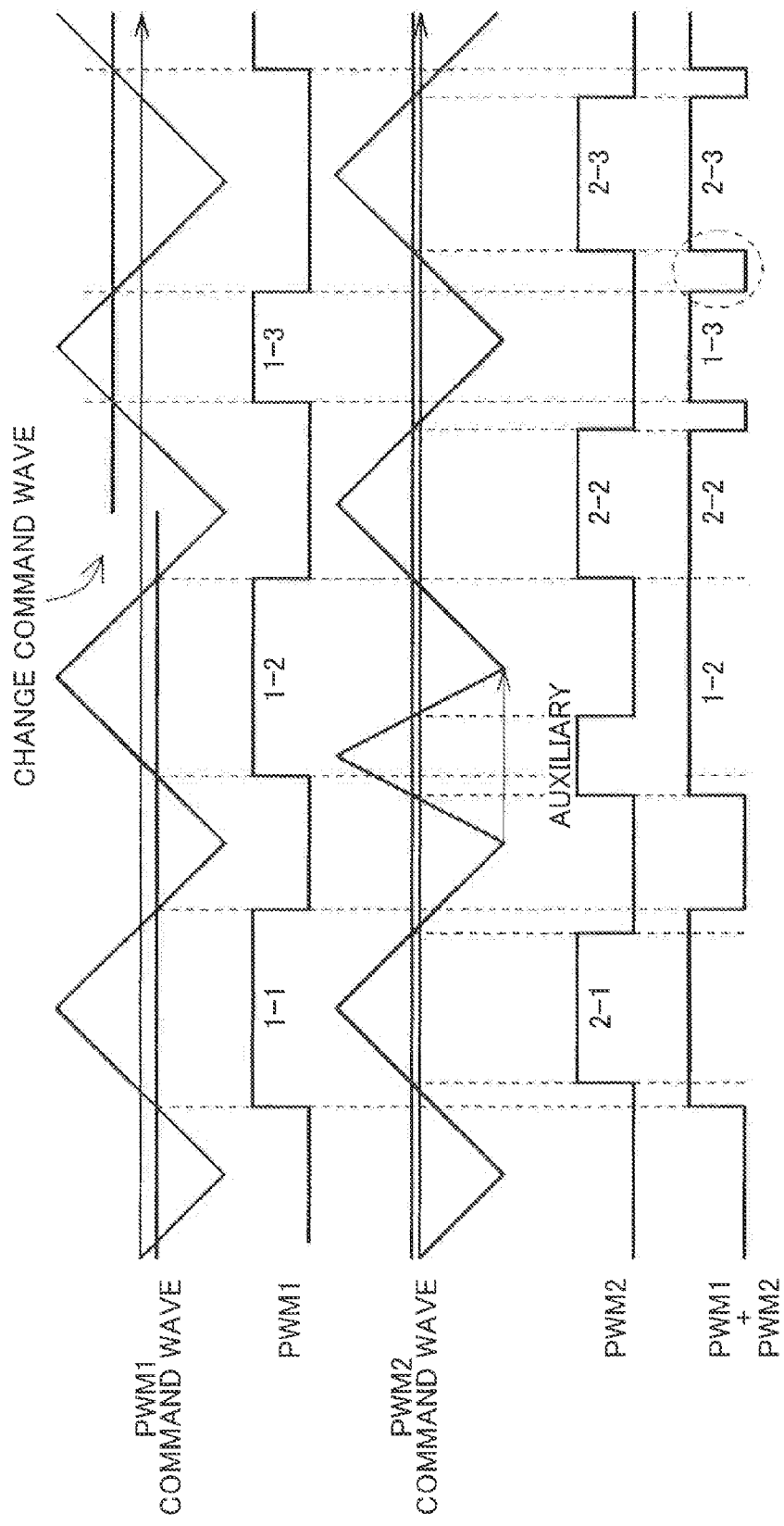
FIG. 19 is a view that illustrates changes in the waveforms of PWM signals at the time when a command wave is changed.

The CNV controller 13 executes a phase shift for coupling the on periods of the PWM signals PWM1, PWM2 in order to reduce a loss that arises in the switching elements S1 to S4. The loss that arises in the switching elements includes a switching loss and an overlap loss. The switching loss arises at the time of switching the on/off states as surrounded by the broken lines in FIG. 17A. The overlap loss arises at the time when the on states overlap with each other. Within an on loss (steady loss), the overlap loss indicates a loss that arises at the time when the on periods of the PWM signals PWM1, PWM2 overlap with each other (at the time when both currents flow overlappingly) as indicated by hatching in FIG. 17B.

The phase shift for reducing the above-described loss will be described initially from an edge-alignment phase shift that is executed generally. In the edge-alignment phase shift, when the falling edge (fall) of the on period of the PWM signal PWM1 and the rising edge (rise) of the on period of the PWM signal PWM2 do not coincide with each other, the phase shift is executed to bring these edges into coincidence (connection) with each other.

As described above, in the parallel step-up/step-down mode of the electric power converter 11, the on/off operations of the switching elements S1 to S4 are controlled in response to the logical addition of the PWM signal PWM1 for the first step-up/step-down circuit CNV1 and the PWM signal PWM2 for the second step-up/step-down circuit CNV2. When the falling edge of the PWM signal PWM1 and the rising edge of the PWM signal PWM2 are brought into coincidence with each other, the number of switching operations (the number of on/off switching operations) reduces, with the result that it is possible to reduce a switching loss.

Figure 8:
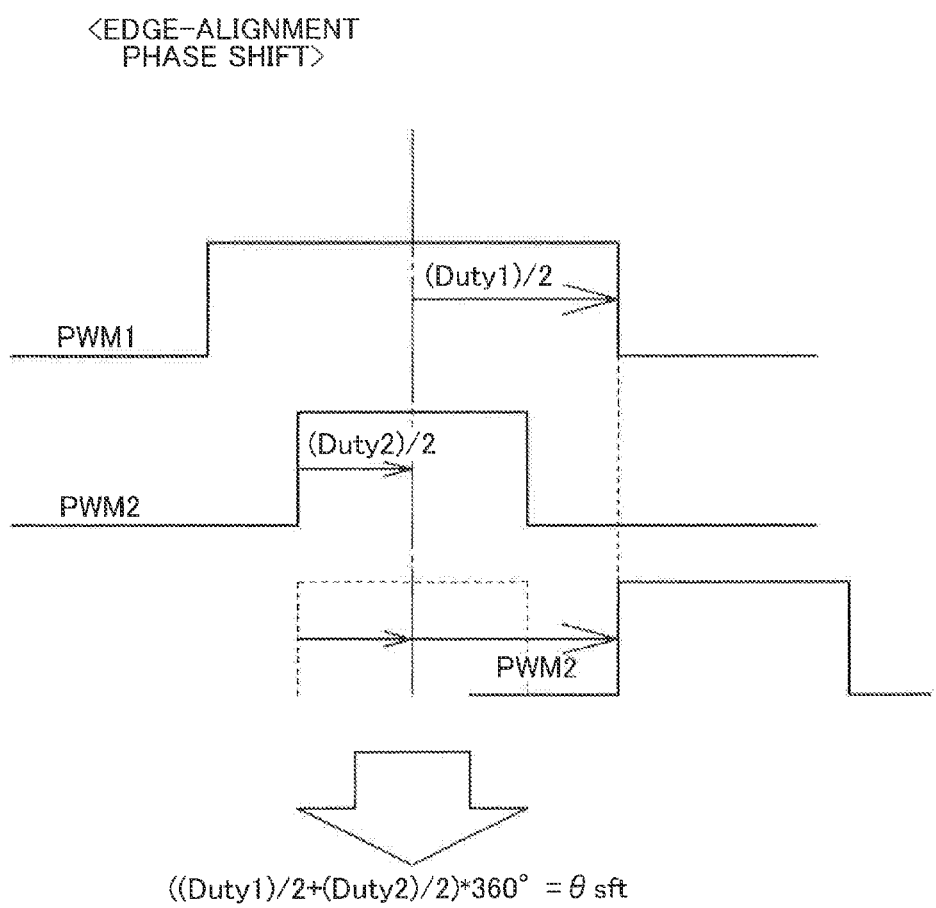
FIG. 8 is a view that illustrates an edge-alignment phase shift.

FIG. 8 shows an example of the edge-alignment phase shift. As shown in the drawing, when the PWM signal PWM2 is shifted by a half of the on period (Duty1)/2 of the PWM signal PWM1 and a half of the on period (Duty2)/2 of the PWM signal PWM2, the rising edge (rise) of a shifted PWM signal PWM2' coincides with the falling edge (fall) of the PWM signal PWM1. When a phase shift amount is indicated by angle, an edge-alignment phase shift amount θsft is expressed by the following mathematical expression (1).

$$\left(\frac{Duty1}{2} + \frac{Duty2}{2}\right) \times 360° = \theta_{sft} \quad (1)$$

The CNV controller 13 shifts the phase of the PWM signal PWM2 by inserting an auxiliary carrier of the phase shift amount θsft obtained through the mathematical expression (1) into the carrier wave of the PWM signal PWM2, thus bringing the rising edge of the PWM signal PWM2 into coincidence with the falling edge of the PWM signal PWM1.

Phase Shift by Controller—Overlap Phase Shift

Next, an overlap phase shift will be described. In this phase shift, at the time of coupling the PWM signals PWM1, PWM2, the phase of at least one of the PWM signals PWM1, PWM2 is shifted by raising the PWM signal PWM2 before the PWM signal PWM1 falls, that is, advancing the rising edge (rise) of the PWM signal PWM2 with respect to the falling edge (fall) of the PWM signal PWM1 such that the on periods of the PWM signals PWM1, PWM2 partially overlap with each other.

FIG. 9 shows an example of the overlap phase shift. In this example, for the sake of easy understanding, as an example of a change in duty ratio, the rate of the PWM signal PWM1 is set to 1.0 (constant), and the rate of the PWM signal PWM2 is set to 0.9. The rates are kept over multiple periods, and the on period of the PWM signal PWM2 is reduced once every period accordingly.

If the edge-alignment phase shift is executed each time the on period is reduced in such a case, a switching loss due to an auxiliary pulse arises once every period as shown in FIG. 20, and there is a concern that the advantage of a reduction in loss due to the phase shift is lost.

The CNV controller 13 executes control by advancing the rising edge of the PWM signal PWM2 with respect to the falling edge of the PWM signal PWM1, in short, providing an overlap width, such that, even when the on period of the PWM signal PWM2 is reduced in the following periods, the rising edge of the PWM signal PWM2 does not separate (delay) from the falling edge of the PWM signal PWM1.

A phase shift amount for the overlap phase shift is set in correspondence with fluctuation predictions in on period. Each fluctuation prediction can be carried out by obtaining rates in the above-described feedback control. FIG. 9 shows an example of the overlap phase shift. Initially, an on period ($Duty2_0 \times Rate2'$) of $PWM2_t$ after an overlap period t (in FIG. 9, t=4) from a current period ($PWM2_0$) is obtained. The PWM signal PWM2 is shifted by a half of the on period ($Duty2_0 \times Rate2'$)/2 and a half of the on period (Duty1)/2 of the PWM signal PWM1. Specifically, the phase shift amount θsft is expressed by the following mathematical expression (2).

$$\left(\frac{Duty1}{2} + \frac{Duty2_0 \times Rate2'}{2}\right) \times 360° = \theta_{sft} \quad (2)$$

Figure 10:
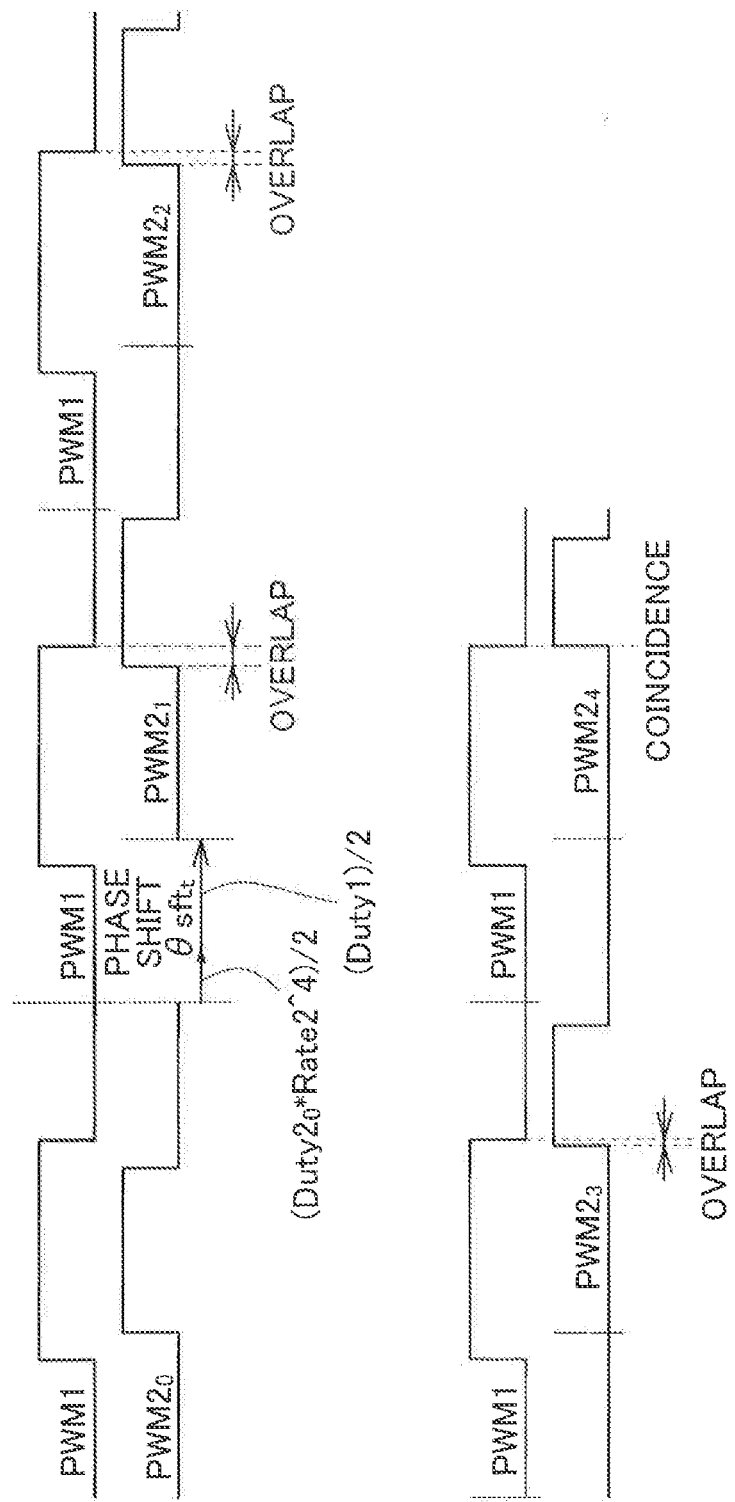
FIG. 10 is a view that illustrates the overlap phase shift.

The CNV controller 13 applies the phase shift based on the shift amount θsft to the next period $PWM2_t$ subsequent to the current period. As a result, as shown in FIG. 10, between the periods $PWM2_1$ to $PWM2_3$, the rising edge of the PWM signal PWM2 is advanced with respect to the falling edge of the PWM signal PWM1, and the advance amount (overlap width) reduces once every period. In addition, in a period $PWM2_4$, the falling edge of the PWM signal PWM1 coincides with the rising edge of the PWM signal PWM2.

In this way, by executing the overlap phase shift, even when the on period of the PWM signal is gradually shortened over multiple periods, separation of the rising edge of the PWM signal PWM2 from the falling edge of the PWM signal PWM1 is avoided. Therefore, the number of times of execution of the phase shift reduces, so it is possible to prevent an increase in switching loss of an auxiliary pulse accordingly.

In the above-described overlap phase shift, an intended overlap period t may be set arbitrarily. For example, a constant (t=5, or the like) may be set. A period required to raise the measured output voltage VH to the target value VH* may be set for the overlap period t. With this configuration, a delay (separation) of the rising edge of the PWM signal PWM2 from the falling edge of the PWM signal PWM1 is avoided over the entire period in which the measured output voltage VH is raised to the target value VH*, so an additional auxiliary pulse is avoided.

In FIG. 9, for the sake of simple illustration, the rate of the PWM signal PWM1 is set to 1.0 (constant); however, the rate is not limited to this configuration. In short, in the case where the edge-alignment phase shift needs to be executed multiple times, there can be an advantage of executing the overlap phase shift instead of the edge-alignment phase shift. That is, when the on period of the PWM signal is shortened and the rising edge of one of the PWM signals delays from the falling edge of the other even with the edge-alignment phase shift once, there is an advantage of executing the overlap phase shift.

The above-described case can occur when the total period of the on-duty periods of the PWM signals PWM1, PWM2 based on fluctuation predictions become short once every period, that is, when the average rate of the PWM signals PWM1, PWM2 becomes smaller than 1.0. For this reason, when both the rates of the PWM signals PWM1, PWM2 are taken into consideration by extending the mathematical expression (2), the mathematical expression (3) is derived as a mathematical expression for obtaining the shift amount $\theta sft_t$ of the overlap phase shift.

$$\left(\frac{Duty1_0 \times Rate1'}{2} + \frac{Duty2_0 \times Rate2'}{2}\right) \times 360° = \theta_{sft_t} \quad (3)$$

The CNV controller 13 obtains the shift amount $\theta sft_t$ of the overlap phase shift on the basis of the mathematical expression (3). Alternatively, the shift amount $\theta sft_t$ is called up as needed by consulting a map obtained in advance as the correlation between the shift amount $\theta sft_t$ and the duties Duty1, Duty2, rates Rate1, Rate2 and overlap period t.

In FIG. 7 and FIG. 9, examples in which the on period is reduced one every period are shown as an example in which the on period is gradually reduced over multiple periods; however, the example in which the on period is gradually reduced over multiple periods is not limited to this example. For example, when the on periods is gradually reduced once every two periods as well, the above-described overlap phase shift may be applied.

In addition, in FIG. 7 and FIG. 9, examples in which the on period is gradually reduced over multiple periods are shown as an example of a change in duty ratio; however, the overlap phase shift is not only limited to these examples. For example, when there arises multiple times the period in which the average rate of the PWM signals PWM1, PWM2 becomes smaller than 1.0 among arbitrary multiple periods, there is an advantage of executing the overlap phase shift as compared to the edge-alignment phase shift.

In such a case, the shift amount $\theta sft_t$ is obtained by setting the overlap period t to the period in which the sum of the on periods of the PWM signals PWM1. PWM2 is the shortest. With this configuration, a delay of the rising edge of PWM2 from the falling edge of PWM1 is avoided in all the periods including the overlap period t.

In the above-described embodiment, only PWM2 is subjected to the phase shift; however, the invention is not limited to this mode. For example, PWM1 may be subjected to the phase shift instead of PWM2 or the shift amount θsft may be distributed between PWM1 and PWM2. For example, both PWM1 and PWM2 may be subjected to the phase shift where the shift amount of PWM1 is set to −θsft/2 and the shift amount of PWM2 is set to θsft/2.

Comparison between Overlap Phase Shift and Edge-Alignment Phase Shift

Figure 11:
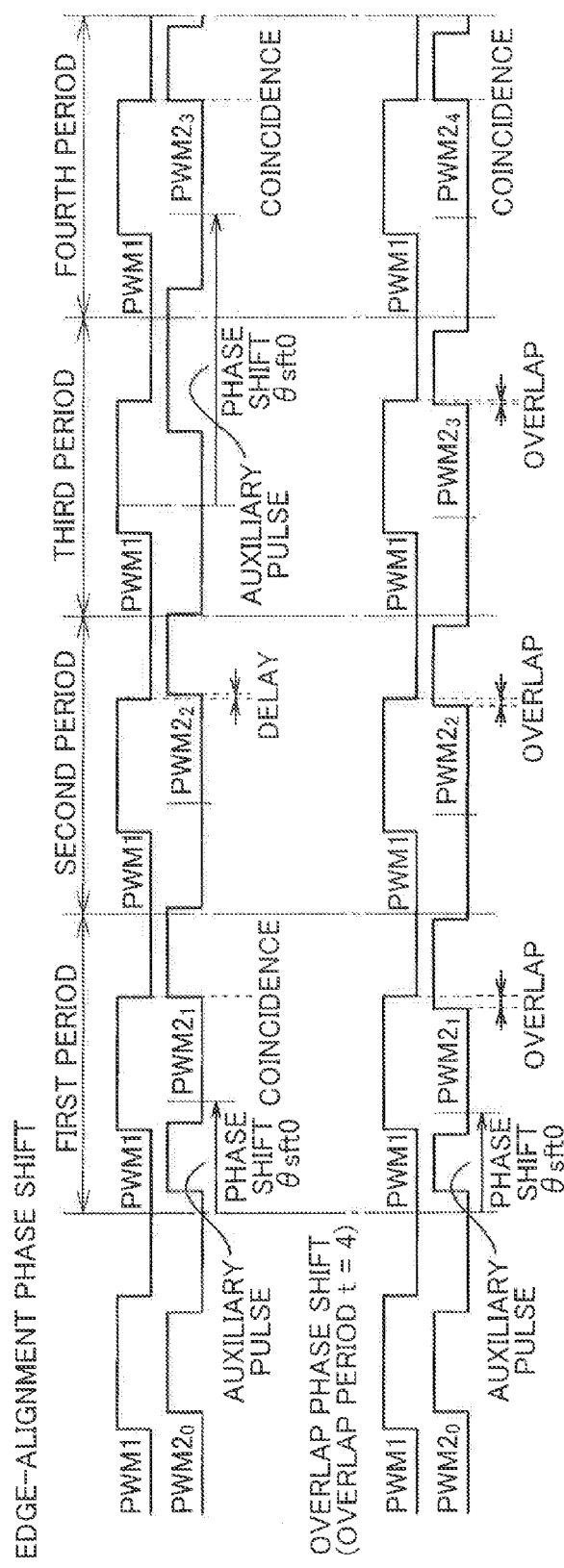
FIG. 11 is a view that, illustrates waveforms at the time of executing the edge-alignment phase shift and waveforms at the time of executing the overlap phase shift.

FIG. 11 illustrates the waveforms of the PWM signals PWM1, PWM2 at the time when the edge-alignment phase shift is executed and the waveforms of the PWM signals PWM1, PWM2 at the time when the overlap phase shift is executed. In this example, where the overlap period t is 4, the waveforms of both the phase shifts until the intended period are shown, in this example, the rate of PWM1 is set to 1.0, and the rate of PWM2 is set to 0.9.

Referring to the edge-alignment phase shift at the top of FIG. 11, an auxiliary pulse is inserted between $PWM2_0$ and $PWM2_1$, and the edges of PWM1 and $PWM2_1$ are aligned. However, the on period of PWM2 is gradually reduced, so the rising edge of $PWM2_2$ delays from the falling edge of PWM1. An auxiliary pulse is inserted again between $PWM2_2$ and $PWM2_3$, and the edges of PWM1 and $PWM2_3$ are aligned.

On the other hand, referring to the overlap phase shift at the bottom of FIG. 11, an auxiliary pulse is inserted between $PWM2_0$ and $PWM2_1$, and the edges are aligned such that the on periods of PWM1 and $PWM2_1$ partially overlap with each other. After that, the coupling relation between PWM1 and PWM2 is maintained until $PWM2_4$ while the overlap width becomes narrower.

In this way, by executing the overlap phase shift, it is possible to reduce the number of times an auxiliary pulse occurs as compared to the case where the edge-alignment phase shift is executed. As a result, it is possible to also reduce a switching loss resulting from an auxiliary pulse.

Selection of Phase Shift Method Based on Loss Estimation

In the overlap phase shift, the rising edge of the PWM signal PWM2 is advanced with respect to the falling edge of the PWM signal PWM1, so there arises an overlap between the on periods of the PWM signals PWM1, PWM2. During the overlap period, an overlap loss shown by hatching in FIG. 17B increases. In addition, as shown in FIG. 11, in the overlap phase shift, because the on period of the auxiliary pulse is shorter than the on period of the auxiliary pulse of the edge-alignment phase shift, there is a case where the auxiliary pulse separates from the PWM signal PWM1 and, as a result, a switching loss arises. By comparing a loss that arises as a result of the overlap phase shift with a loss that arises as a result of the edge-alignment phase shift, a phase shift that produces less loss may be selected.

The CNV controller 13 carries out fluctuation predictions of the on periods from an execution period of the phase shift to a predetermined period and estimates a power loss that arises in the switching elements S1 to S4 in the period from the execution period to the predetermined period in the case where the overlap phase shift is executed. In parallel with this, the CNV controller 13 estimates a power loss that arises in the switching elements S1 to S4 in the period from the execution period to the predetermined period in the case where the edge-alignment phase shift is executed. In addition, by comparing both the losses with each other, the phase shift that produces less power loss is executed.

Figure 12:
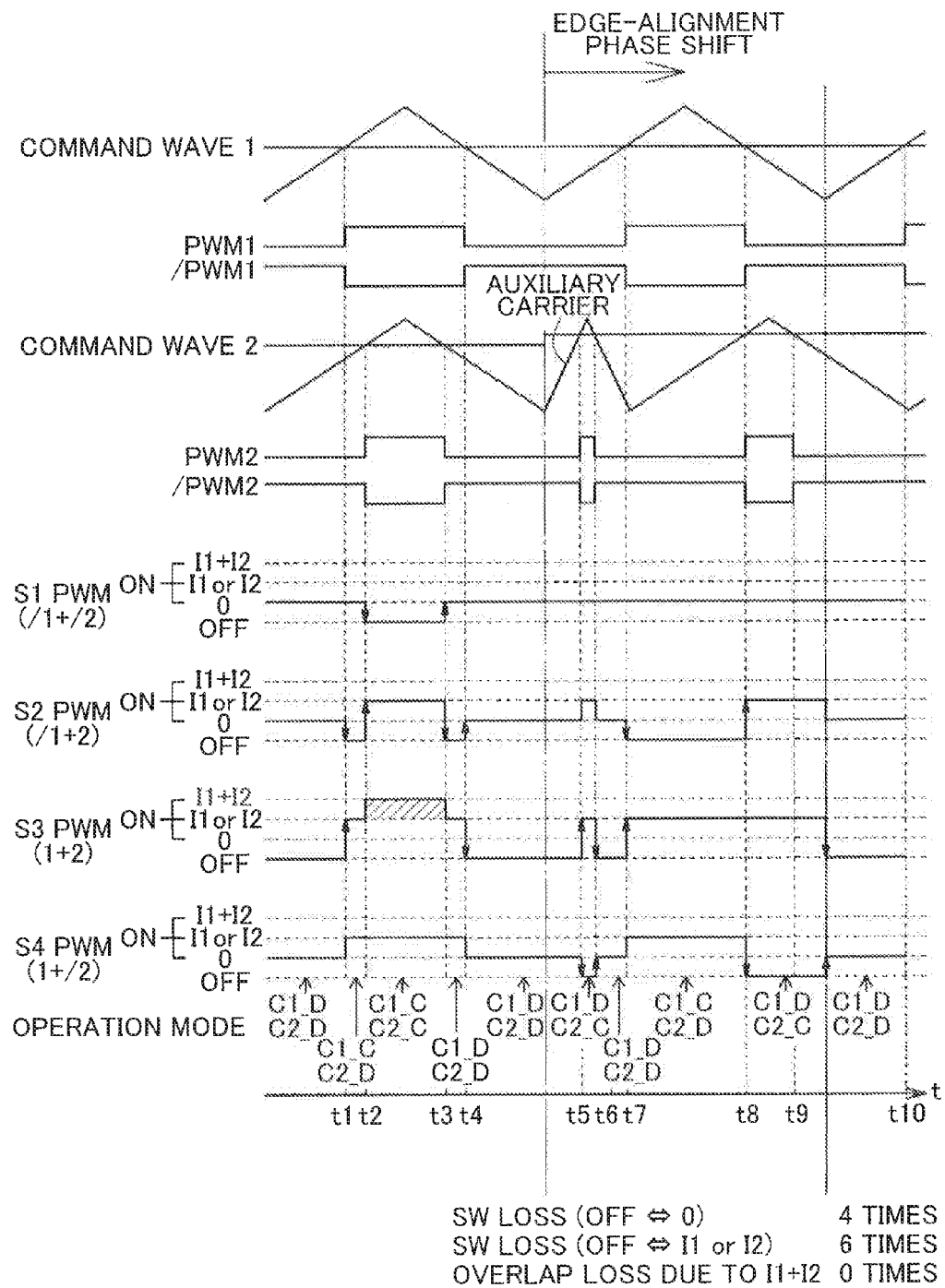
FIG. 12 is a view that illustrates estimation of a loss at the time of executing the edge-alignment phase shift.
Figure 13:
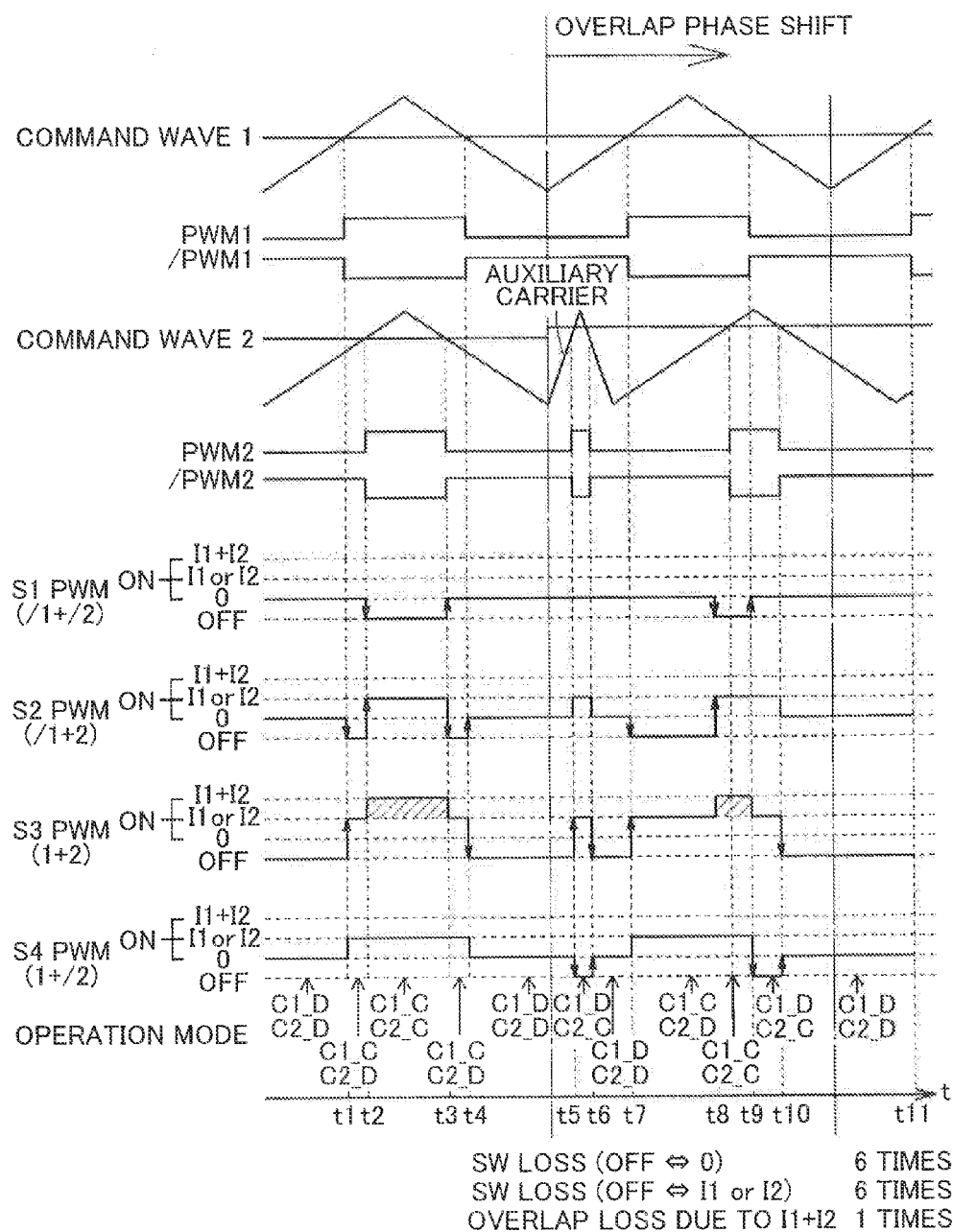
FIG. 13 is a view that illustrates estimation of a loss at the time of executing the overlap phase shift.

A power loss due to the edge-alignment phase shift and a power loss due to the overlap phase shift can be estimated by simulation, or the like. FIG. 12 and FIG. 13 illustrate time charts for estimating power losses at the time when the respective phase shifts shown in FIG. 11 are executed. For the sake of convenience of the drawing, the time charts from $PWM2_0$ to $PWM2_1$ are excerpted and shown.

From the top of the time chart of FIG. 12, /PWM1, /PWM2 respectively denote the inversion signals of PWM1, PWM2. The fluctuations in these signals are predicted by obtaining the above-described rates. S1 PWM to S4 PWM respectively denote the PWM signals that are transmitted to the switching elements S1 to S4. In addition to the on/off states of the switching elements S1 to S4, current components in the on state are shown to the right of S1 PWM to S4 PWM.

Inscriptions, such as (/1+2), denote superimposed signals of the PWM signals PWM1, PWM2, which are transmitted to the corresponding switching elements. For example, in the case of (/1+2), the PWM signals of /PWM1 and PWM2 are superimposed. In addition, an operation mode at the bottom indicates the charge/discharge mode of each of the first, step-up/step-down circuit CNV1 and the second step-up/step-down circuit CNV2 at each time. C1, C2 respectively denote the first and second step-up/step-down circuits CNV1, CNV2, the suffix _C denotes the charge mode, and the suffix _D denotes the discharge mode.

From the waveforms of PWM1, /PWM1, PWM2, /PWM2, the on/off states of the switching elements S1 to S4 are obtained. In addition, by narrowing which one of the operation modes shown in FIG. 3 to FIG. 6, the on/off patterns of the switching elements S1 to S4 correspond to, current components respectively flowing through the switching elements S1 to S4 are obtained.

The left side of the sheet (the left side of the alternate long and short dashed line) of FIG. 12 shows the waveforms before the edge-alignment phase shift is executed, and the right side of the sheet shows the waveforms after the edge-alignment phase shift is executed. Among the waveforms of S1 PWM to S4 PWM, the arrows indicate that a switching loss arises. The hatching indicates that an overlap loss arises because of an overlap of currents I1+I2.

Referring to the waveforms of S1 PWM to S4 PWM after the edge-alignment phase shift, the number of switching losses is ten, and the number of overlap losses due to current overlap (I1+I2) is 0. In addition, among the ten switching losses, four switching losses are caused by the state where a current (collector current) flowing through the switching element is zero at the time of on/off switching, and six switching losses are caused by the state where current flowing through the switching element is I1 or I2. Because each switching loss is proportional to a collector current, the former may be ignored as a power loss. Therefore, the number of switching losses that are counted as a power loss is six where the collector current I1 or I2 flows at the time of on/off switching.

FIG. 13 illustrates a time chart for estimating a power loss at the time when the overlap phase shift is executed. The symbols and inscriptions shown in the time chart are similar to those of FIG. 12, so the description thereof is omitted.

The waveforms after the overlap phase shift is executed are shown at the right side of the sheet, (the right side of the alternate long and short dashed line). When losses at this time are counted, the number of switching losses caused by the fact that the collector current I1 or I2 flows at the time of on/off switching is six, and the number of overlap losses due to a current overlap (I1+I2) is one.

FIG. 12 and FIG. 13 show the waveforms of only one period in which the phase shift is executed. A power loss is obtained by extending the waveforms of one period to the overlap period t for both the edge-alignment phase shift and the overlap phase shift. With this configuration, it is possible to estimate a total loss from a phase shift execution period (the first period in FIG. 11) over the overlap period t (four periods) at the time when the overlap phase shift or the edge-alignment phase shift is executed. It is possible to select the phase shift that produces less power loss by utilizing the estimated result.

Such simulation can be executed by the CNV controller 13 as needed; however, a time that is allowed to be allocated to arithmetic processing is limited (for example, one control period), so the result of the above-described simulation on the operations of the switching elements S1 to S4 may be stored in the storage unit of the controller 22 as a loss map in advance and may be called up as needed.

When the loss map is stored in advance, not only comparison of the number of power losses but also estimation made by higher-level computation may be carried out. That is, an estimated loss amount that incorporates the duration of current I1+I2 for an overlap loss, the loss characteristics (turn-on/turn-off loss) of each switching element for a switching loss, and the like, may be obtained and compared.

Flow of Phase Shift

Figure 14:
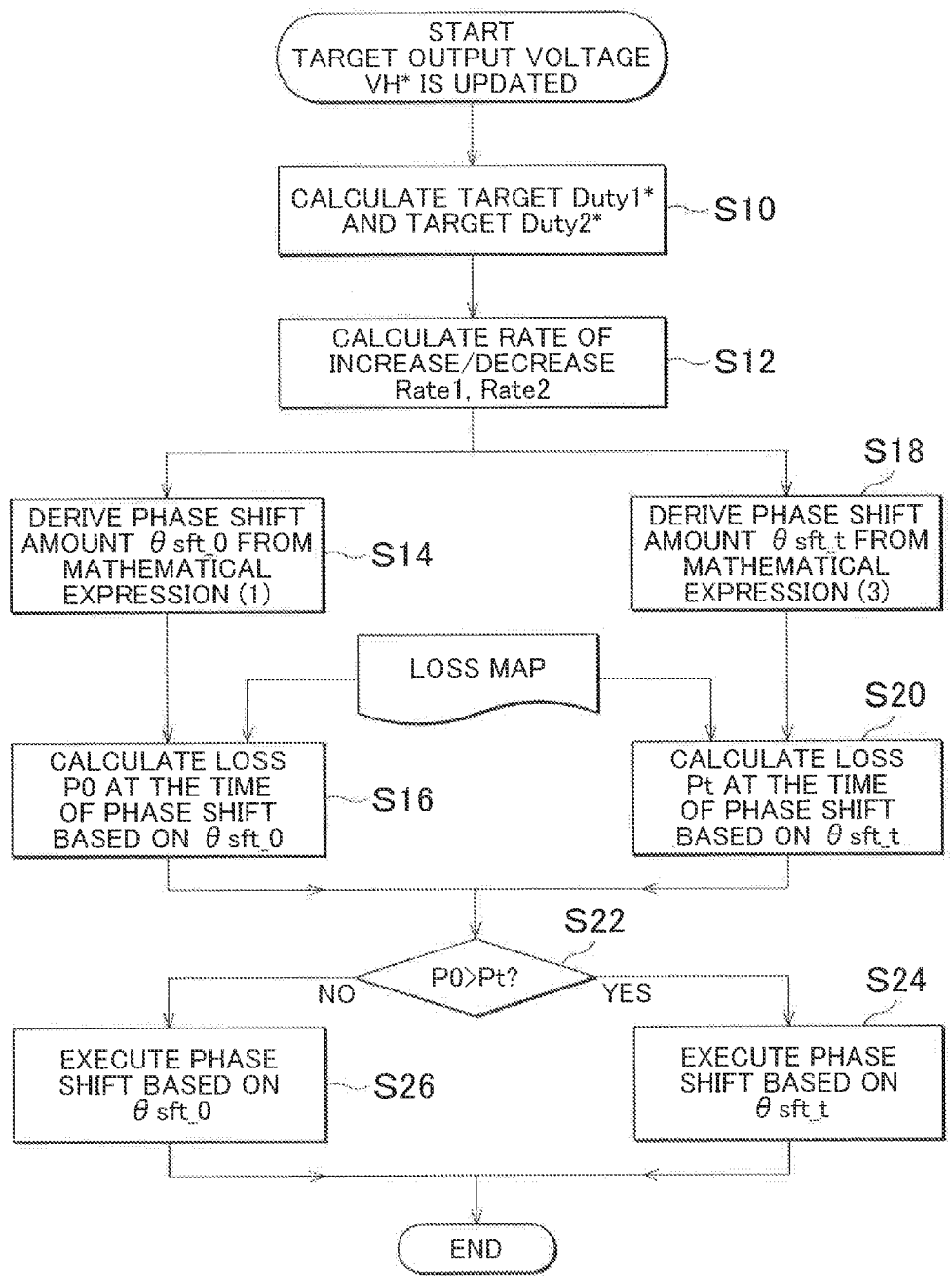
FIG. 14 is a flowchart at the time when the phase shift is executed by the CNV controller.

FIG. 14 shows a flowchart of the above-described control. Initially, as a trigger to start the phase shift, the target output voltage VH* is transmitted to the controller 22, and the target output voltage VH* is updated. The CNV controller 13 calculates a target Duty1* and a target Duty2* that are target values of the on periods of the PWM signals PWM1, PWM2 on the basis of the target output voltage VH* (S10).

Subsequently, the CNV controller 13 obtains the rates Rate1, Rate2 of the PWM signals PWM1, PWM2 (S12). As described above, an upper limit value of the feedback gain or a value smaller than or equal to the upper limit value is set for the rates.

Subsequently, the CNV controller 13 compares the loss of the edge-alignment phase shift with the loss of the overlap phase shift. The CNV controller 13 calculates the phase shift amount $\theta sft_0$ from the on periods (on-duty periods) $Duty1_0$, $Duty2_0$ of the current period on the basis of the mathematical expression (1) (S14). Alternatively, the edge-alignment phase shift amount $\theta sft_0$ is called up from the shift amount map that defines the correlation between each of $Duty1_0$ and $Duty2_0$ and the edge-alignment phase shift amount $\theta sft_0$.

In addition, the CNV controller 13 estimates a loss at the time when the edge-alignment phase shift is executed by using the phase shift amount $\theta sft_0$ by consulting the loss map (S16).

The CNV controller 13 estimates a power loss due to the overlap phase shift in parallel with estimation of a power loss due to the edge-alignment phase shift. The CNV controller 13 calculates the overlap phase shift amount $\theta sft$ from the on periods $Duty1_0$, $Duty2_0$ of the current period, the rates Rate1, Rate2, and the overlap period t on the basis of the mathematical expression (3) (S18). Alternatively, the edge-alignment phase shift amount $\theta sft_t$ is called up from the shift amount map that defines the correlation between the edge-alignment phase shift amount $\theta sft_t$ and each of $Duty1_0$, $Duty2_0$, Rate1, Rate2, and the overlap period t.

In addition, the CNV controller 13 estimates a loss at the time when the overlap phase shift is executed by using the phase shift amount $\theta sft_t$ by consulting the loss map (S20).

The CNV controller 13 compares an estimated loss amount P0 based on the edge-alignment phase shift with an estimated loss amount Pt based on the overlap phase shift (S22). When the estimated loss amount Pt is smaller than the estimated loss amount P0, the CNV controller 13 executes the overlap phase shift, that is, the CNV controller 13 outputs a composite signal (logical addition signal) of the PWM signals PWM1, PWM2 based on the overlap phase shift to the switching elements S1 to S4 (S24). When the estimated loss amount Pt is larger than or equal to the estimated loss amount P0, the CNV controller 13 executes the edge-alignment phase shift (S26).

When the edge-alignment phase shift is selected, the CNV controller 13 executes the edge-alignment phase shift each time it is detected that the falling edge of the PWM signal PWM1 and the rising edge of the PWM signal PWM2 do not coincide with each other in a period until the on-duty periods of the PWM signals PWM1, PWM2 respectively reach target on-duty periods Duty1*, Duty2*.

First Alternative Embodiment of Electric Power Converter

In the above-described embodiment, a so-called series-parallel converter that includes the four switching elements and that is able to switch between series connection and parallel connection is described as the electric power converter 11; however, the electric power converter is not limited to this configuration. In short, as long as an electric power converter that includes two step-up/step-down circuits, which are operated in parallel with each other, with such a circuit configuration that switching elements are turned on or off in accordance with the logical addition of PWM signals of these step-up/step-down circuits, the invention is applicable.

Figure 15:
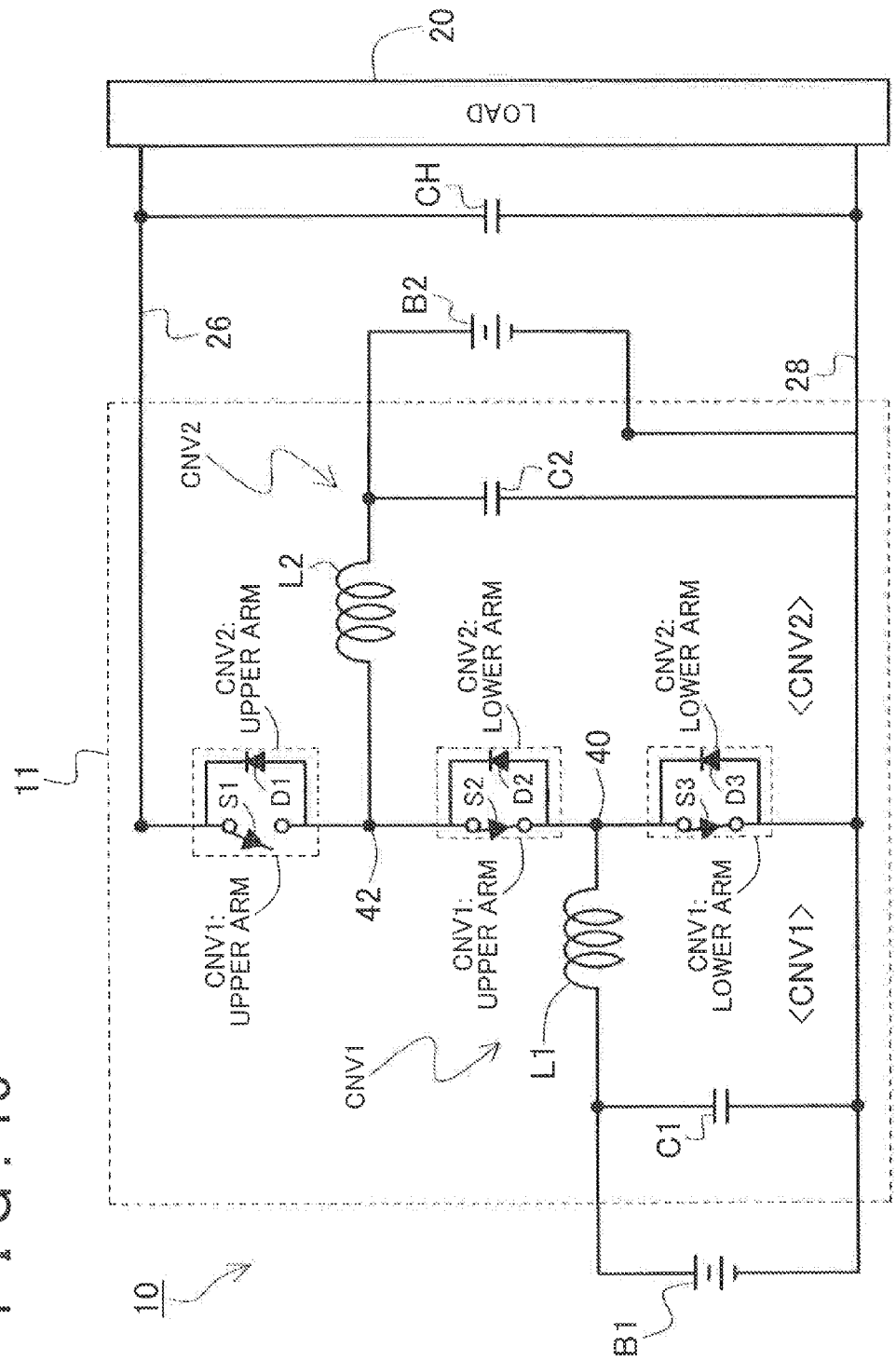
FIG. 15 is a view that illustrates the configuration of an electric power converter according to an alternative embodiment to the above embodiment.

FIG. 15 shows an alternative embodiment of the electric power converter 11. The electric power converter 11 includes three series-connected arms from the high-voltage line 26 toward the reference line 28.

In addition, the first battery B1 is connected between the connection point 40 and the reference line 28. The connection point 40 is provided between the second arm and the third arm from the high-voltage line 26 side. In addition, the first reactor L1 is provided in series with the first battery B1, and the first capacitor C1 is provided in parallel with the first battery B1.

The second battery B2 is connected between the connection point 42 and the reference line 28. The connection point 42 is provided between the first arm and the second arm from the high-voltage line 26 side. In addition, the second reactor L2 is provided in series with the second battery B2, and the second capacitor C2 is provided in parallel with the second battery B2.

The first step-up/step-down circuit CNV1 is established between the first battery B1 and the high-voltage line 26 (output line). The second step-up/step-down circuit CNV2 is established between the second battery B2 and the high-voltage line 26. The first step-up/step-down circuit CNV1 includes the first battery B1, the first reactor L1 and the first capacitor C1. The second step-up/step-down circuit CNV2 is provided in parallel with the first step-up/step-down circuit CNV1, and includes the second battery B2, the second reactor L2 and the second capacitor C2. The switching elements S1 to S4 turn on or off to switch between storage and discharge of electric charge of the first and second reactors L1, L2.

Based on the above-described definition of the upper arm and the lower arm, the arm (S1 arm) including the switching element S1 and the diode D1 is an upper arm when viewed from the first and second step-up/step-down circuits CNV1, CNV2. The arm (S2 arm) including the switching element S2 and the diode D2 is an upper arm when viewed from the first step-up/step-down circuit CNV1, and is a lower arm when viewed from the second step-up/step-down circuit CNV2. In addition, the arm (S3 arm) including the switching element S3 and the diode D3 is a lower arm when viewed from the first and second step-up/step-down circuits CNV1, CNV2.

The PWM signals PWM1 for the first step-up/step-down circuit CNV1 (PWM1 and its inversion signal /PWM1) and the PWM signal PWM2 for the second step-up/step-down circuit CNV2 (PWM2 and its inversion signal /PWM2) are assigned to the switching elements S1 to S3 on the basis of the above-described distribution of functions of the upper and lower arms. The CNV controller 13 executes the above-described phase shift over the PWM signals PWM1, PWM2.

Second Alternative Embodiment of Electric Power Converter

Figure 16:
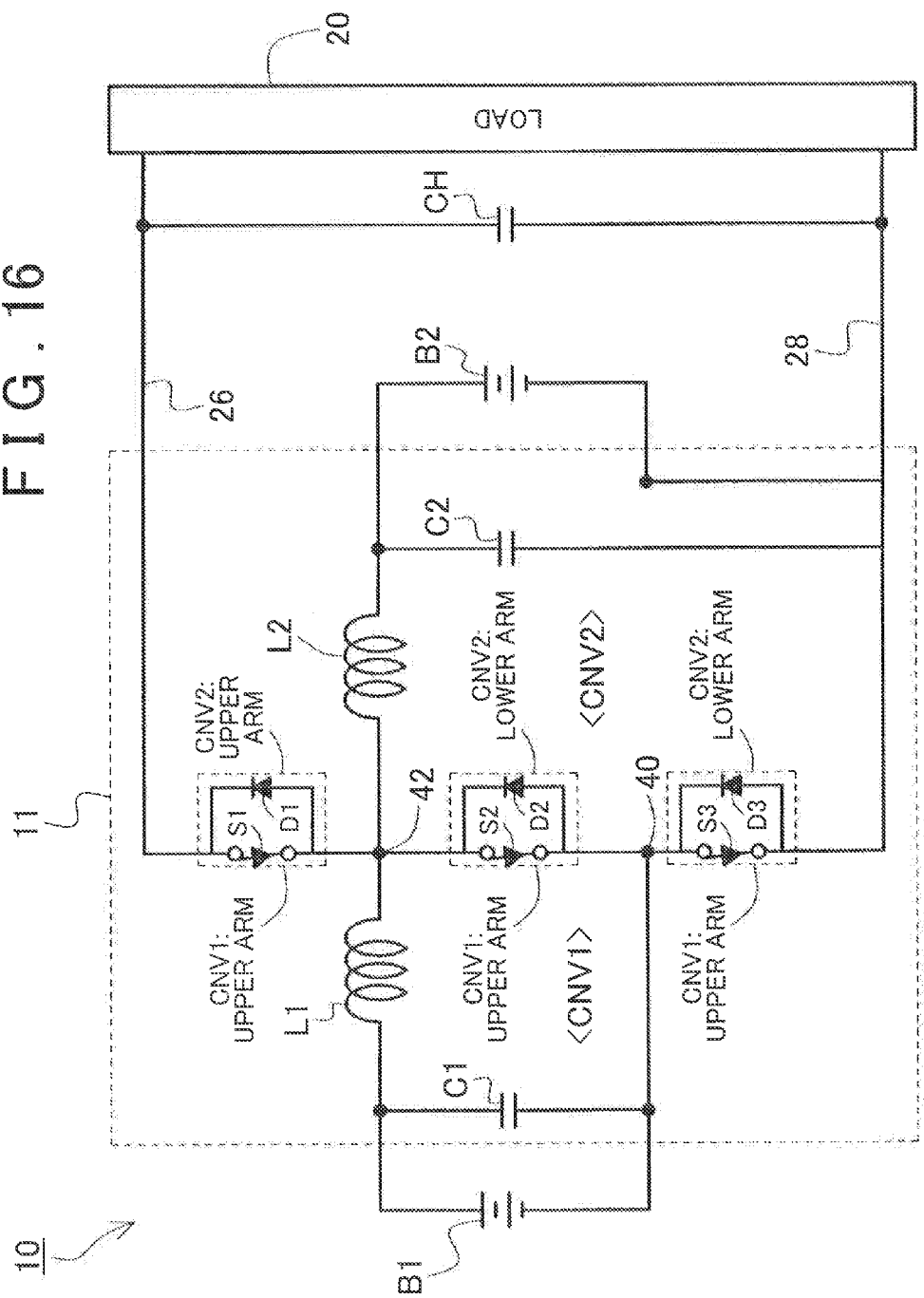
FIG. 16 is a view that illustrates the configuration of an electric power convener according to a further alternative embodiment to the above embodiment.

FIG. 16 shows a further alternative embodiment of the electric power converter 11. The electric power converter 11, as in the case of FIG. 15, includes three series-connected arms from the high-voltage line 26 toward the reference line 28.

The electric power converter 11 shown in FIG. 16 differs from the electric power converter 11 shown in FIG. 15 in arrangement of the first step-up/step-down circuit CNV1. That is, the first battery B1, the first reactor L1 and the first capacitor C1 are connected between the connection point 42 and the connection point 40. The connection point 42 is provided between the first arm and the second arm from the high-voltage line 26 side. The connection point 40 is provided between the second arm and the third arm from the high-voltage line 26 side.

Based on the above-described definition of the upper arm and the lower arm, the arm (S1 arm) including the switching element S1 and the diode D1 is an upper arm when viewed from the first and second step-up/step-down circuits CNV1, CNV2. The arm (S2 arm) including the switching element S2 and the diode D2 is a lower arm when viewed from the first and second step-up/step-down circuits CNV1, CNV2. In addition, the arm (S3 arm) including the switching element S3 and the diode D3 is an upper arm when viewed from the first step-up/step-down circuit CNV1 and is a lower arm when viewed from the second step-up/step-down circuit CNV2.

The PWM signal PWM1 for the first step-up/step-down circuit CNV1 and the PWM signal PWM2 for the second step-up/step-down circuit CNV2 are assigned to the switching elements S1 to S3 on the basis of the above-described distribution of functions of the upper and lower arms. The CNV controller 13 executes the above-described phase shift over the PWM signals PWM1, PWM2.

What is claimed is:

1. An electric power conversion system comprising:
a first battery;
a second battery;
an electric power converter including a plurality of switching elements, the electric power converter being configured to bidirectionally step up or step down electric power between an output line and each the first and second batteries by turning on or off the plurality of switching elements in accordance with PWM signals; and
a controller configured to control a first step-up and step-down circuit and a second step-up and step-down circuit by generating a first PWM signal and a second PWM signal, the first step-up and step-down circuit being established between the first battery and the output line, the first PWM signal being a signal for controlling step-up and step-down operation of the first step-up and step-down circuit, the second step-up and step-down circuit being established between the second battery and the output line, the second PWM signal being a signal for controlling step-up and step-down operation of the second step-up and step-down circuit, the controller being configured to, at the time of coupling on-duty periods of both the first and second PWM signals with each other by shifting a phase of at least one of the first and second PWM signals, execute an overlap phase shift that partially overlaps the on-duty periods of the first and second PWM signals by raising one of the PWM signals before the other one of the PWM signals falls,
wherein a phase shift amount for the overlap phase shift is set in correspondence with fluctuation predictions of the on-duty periods, and the controller is configured to, when a total period of the on-duty periods of the first and second PWM signals based on the fluctuation predictions becomes short once every period, set the phase shift amount such that a fall of one of the first and second PWM signals in a predetermined period coincides with a rise of the other one of the first and second PWM signals in the predetermined period.

2. The electric power conversion system according to claim 1, wherein the controller is configured to (i) carry out the fluctuation predictions of the on-duty periods from an execution period of the phase shift to the predetermined period, and (ii) when a first loss is smaller than a second loss as a result of comparison between the first loss and the second loss, execute the overlap phase shift, wherein the first loss includes a loss that arises in the switching elements in a period from the execution period to the predetermined period when the overlap phase shift is executed, and the second loss includes a loss that arises in the switching elements in the period from the execution period to the predetermined period when an edge-alignment phase shift is executed, the edge-alignment phase shift is a phase shift by which, when a fall of the one of the PWM signals and a rise of the other one of the PWM signals do not coincide with each other, the fall and the rise are brought into coincidence with each other.

* * * * *